(12) United States Patent
Yano et al.

(10) Patent No.: US 7,949,901 B2
(45) Date of Patent: May 24, 2011

(54) PROGRAM AND APPARATUS FOR GENERATING SYSTEM TEST SPECIFICATIONS

(75) Inventors: Keisuke Yano, Kawasaki (JP); Tsuyoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 12/068,353

(22) Filed: Feb. 5, 2008

(65) Prior Publication Data

US 2008/0244317 A1  Oct. 2, 2008

(30) Foreign Application Priority Data

Mar. 26, 2007  (JP) .................................. 2007-078077

(51) Int. Cl.
*G06F 11/36* (2006.01)
(52) U.S. Cl. ............. 714/33; 714/37; 717/124; 717/126
(58) Field of Classification Search .................... 714/33, 714/38
See application file for complete search history.

(56) References Cited

U.S. PATENT DOCUMENTS

| | | | | |
|---|---|---|---|---|
| 5,828,829 A | * | 10/1998 | Yamauchi et al. | 714/38 |
| 6,243,835 B1 | * | 6/2001 | Enokido et al. | 714/38 |
| 6,385,741 B1 | * | 5/2002 | Nakamura | 714/38 |
| 2002/0029377 A1 | * | 3/2002 | Pavela | 717/124 |
| 2004/0103396 A1 | * | 5/2004 | Nehab | 717/127 |
| 2006/0107141 A1 | * | 5/2006 | Hekmatpour | 714/724 |
| 2006/0184918 A1 | * | 8/2006 | Rosaria et al. | 717/124 |
| 2006/0294434 A1 | * | 12/2006 | Ikeda et al. | 714/38 |
| 2007/0157169 A1 | * | 7/2007 | Chen et al. | 717/120 |
| 2007/0214451 A1 | * | 9/2007 | Watzl | 717/129 |
| 2007/0266165 A1 | * | 11/2007 | Li | 709/230 |
| 2008/0109475 A1 | * | 5/2008 | Burmester et al. | 707/102 |

OTHER PUBLICATIONS

Patent Abstracts of Japan, Publication No. 11-282666, published Oct. 15, 1999 (1 page).

* cited by examiner

*Primary Examiner* — Scott T Baderman
*Assistant Examiner* — Chae Ko
(74) *Attorney, Agent, or Firm* — Fujitsu Patent Center

(57) ABSTRACT

A computer program automatically producing a system test specification adapted for real-life use of a computer system, such that the system's most important processing functions can be tested. An update record storage unit stores update records each including: a process identifier of a data updating process, the name of a dataset updated by that process, and an update timestamp. A function test data storage unit stores data of function tests for checking whether each module realizing operation steps of an operation flow satisfies specified requirements. An operation flow extractor creates a flow descriptor enumerating the names of datasets updated by a data updating process in chronological order. From the stored function test data, a system test generator compiles a system test description for each operation flow, which specifies a series of function tests in the same order as the operation steps constituting each operation flow.

5 Claims, 23 Drawing Sheets

FIG. 5

| UPDATE RECORD TABLE 111 | | |
|---|---|---|
| PROCESS ID | TABLE NAME | UPDATE TIMESTAMP |
| 0001 | QUOTE | 2007/03/01 11:22:31 |
| 0001 | ENTER ORDER | 2007/03/01 11:25:43 |
| 0001 | SUBMIT ORDER | 2007/03/01 11:29:56 |
| 0002 | QUOTE | 2007/03/01 14:32:53 |
| 0002 | ENTER ORDER | 2007/03/01 14:33:02 |
| ⋮ | ⋮ | ⋮ |
| 111a | 111b | 111c |

FIG. 7

| OCCURRENCE COUNT | OPERATION FLOW TABLE 121 |
|---|---|
| | TABLE CHAIN |
| 100 | QUOTE, ENTER ORDER, SAVE ORDER, SUBMIT ORDER |
| 50 | QUOTE, ENTER ORDER, SAVE ORDER, ENTER ORDER, SUBMIT ORDER |
| 701 | QUOTE, ENTER ORDER, SAVE ORDER |
| 1020 | QUOTE, ENTER ORDER, SUBMIT ORDER |
| ... | ... |

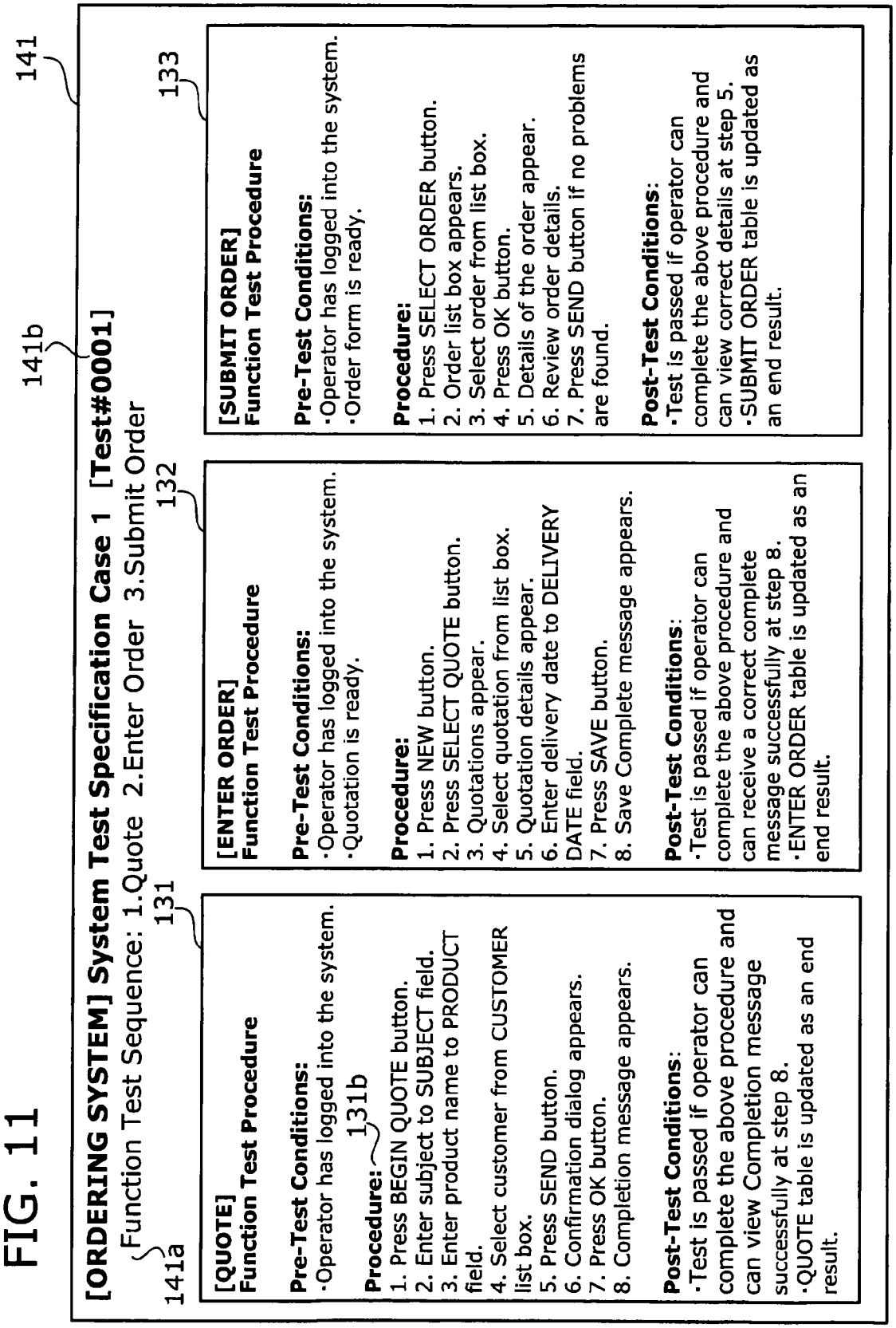

[ORDERING SYSTEM] System Test Specification Case 1  [Test#0001]
Function Test Sequence: 1.Quote  2.Enter Order  3.Submit Order

[QUOTE]
Function Test Procedure

Pre-Test Conditions:
· Operator has logged into the system.

Procedure:
1. Press BEGIN QUOTE button.
2. Enter subject to SUBJECT field.
3. Enter product name to PRODUCT field.
4. Select customer from CUSTOMER list box.
5. Press SEND button.
6. Confirmation dialog appears.
7. Press OK button.
8. Completion message appears.

Post-Test Conditions:
· Test is passed if operator can complete the above procedure and can view Completion message successfully at step 8.
· QUOTE table is updated as an end result.

[ENTER ORDER]
Function Test Procedure

Pre-Test Conditions:
· Operator has logged into the system.
· Quotation is ready.

Procedure:
1. Press NEW button.
2. Press SELECT QUOTE button.
3. Quotations appear.
4. Select quotation from list box.
5. Quotation details appear.
6. Enter delivery date to DELIVERY DATE field.
7. Press SAVE button.
8. Save Complete message appears.

Post-Test Conditions:
· Test is passed if operator can complete the above procedure and can receive a correct complete message successfully at step 8.
· ENTER ORDER table is updated as an end result.

[SUBMIT ORDER]
Function Test Procedure

Pre-Test Conditions:
· Operator has logged into the system.
· Order form is ready.

Procedure:
1. Press SELECT ORDER button.
2. Order list box appears.
3. Select order from list box.
4. Press OK button.
5. Details of the order appear.
6. Review order details.
7. Press SEND button if no problems are found.

Post-Test Conditions:
· Test is passed if operator can complete the above procedure and can view correct details at step 5.
· SUBMIT ORDER table is updated as an end result.

FIG. 18

| ROUTINE OPERATION FLOW DESCRIPTORS | | 571 |
|---|---|---|
| OCCURRENCE COUNT | TABLE CHAIN | |
| 1020 | QUOTE, ENTER ORDER, SUBMIT ORDER | |
| 701 | QUOTE, ENTER ORDER, SAVE ORDER | |
| ⋮ | ⋮ | |

| OCCURRENCE COUNT | EXCEPTIONAL OPERATION FLOW DESCRIPTORS | |
| --- | --- | --- |
| | TABLE CHAIN | REDO INDICATOR |
| 100 | QUOTE, ENTER ORDER, SAVE ORDER, SUBMIT ORDER | |
| 50 | QUOTE, ENTER ORDER, SAVE ORDER, ENTER ORDER, SUBMIT ORDER | REDOING INVOLVED |
| ... | ... | ... |

572a  572b  572c

572

PROGRAM AND APPARATUS FOR GENERATING SYSTEM TEST SPECIFICATIONS

CROSS-REFERENCE TO RELATED APPLICATIONS

This application is based upon and claims the benefits of priority from the prior Japanese Patent Application No. 2007-078077, filed on Mar. 26, 2007, the entire contents of which are incorporated herein by reference.

BACKGROUND OF THE INVENTION

1. Field of the Invention

The present invention relates to a computer program and an apparatus for generating test specifications, and more particularly to a computer program and an apparatus for automatically generating system test specifications for a computer system.

2. Description of the Related Art

As an example of conventional techniques in the field stated above, Japanese Patent Application Publication No. 11-282666 (1999) discloses a test specification generator that uses design data repositories created in the design stage in order to produce a test specification automatically for use in a subsequent test stage. The resulting test specification enables efficient execution of testing tasks, thus contributing to improved productivity of system development.

While the above conventional technique works well for development of new systems, a problem may arise after the development is finished, particularly when it becomes necessary to review the systems for the purpose of retesting or redesigning. Suppose, for example, that some part of an existing computer system is modified or expanded several years after its deployment. In such a case, the entire system, rather than the limited portion of the system that has been modified or expanded, has to be tested again. The passage of time, however, often makes it difficult to collect necessary design data of the system. Specifically, the original design documents may have been lost, or even if some of such documents have survived, their content may not always be sufficient for the new development team to modify the system. The key engineers who developed the original system may be no longer accessible for consultation.

Usage and operations of a computer system are not always consistent with time. Rather, some part of the original system design may become obsolete or impractical during its long time use. A gap may arise between the real-life use of the system and what the system engineers assumed at the time of design. Some users may interact with the system often in an unexpected way, as opposed to the designers' intention at the development phase.

When an existing system is modified, one could perform again a thorough test on the entire system, covering all flows of operations as the scope of the test, and assuming every possible usage of the system that one can think of. This approach is, however, unrealistic since such an exhaustive system test includes testing of obsolete operation flows that never occur in actual business situations.

SUMMARY OF THE INVENTION

In view of the foregoing, it is an object of the present invention to provide a computer program and an apparatus that can automatically produce a system test specification adapted for real-life use of a computer system, based on data collected during the actual operations of the system, so that its important processing functions can be tested.

To accomplish the above object, the present invention provides a computer-readable medium storing a program for generating a system test specification for a computer system. This program causes a computer to function as the following elements: an update record storage unit, a function test data storage unit, an operation flow extractor, and a system test generator. The update record storage unit stores update records each including: a process identifier that uniquely identifies a data updating process executed on a dataset, a dataset name indicating which dataset was updated by that data updating process, and an update timestamp indicating when the dataset was modified. The function test data storage unit stores function test data indicating procedures of function tests. Each function test checks whether each module realizing operation steps constituting an operation flow executed on the computer system satisfies specified requirements. The operation flow extractor analyzes the update records stored in the update record storage unit to create a flow descriptor for each data updating process identified by the process identifier. The flow descriptor contains names of all datasets updated by the data updating process, where the dataset names are sorted in chronological order of the updating. The system test generator consults the function test data storage unit to retrieve function test data corresponding to each operation step of an operation flow indicated by the flow descriptor that the operation flow extractor has created. The system test generator then creates a system test description describing the order of function tests, for each operation flow indicated by the flow descriptor. The order of those function tests described in the created system test description matches with that of operation steps constituting the operation flow.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an example data structure of an update record table.

FIG. 7 shows an example data structure of an operation flow table.

FIG. 11 shows an example of a system test description produced according to the first embodiment.

FIG. 18 shows an example data structure of routine operation flow descriptors.

FIG. 19 shows an example data structure of exceptional operation flow descriptors.

DESCRIPTION OF THE PREFERRED EMBODIMENTS

Figure 1:
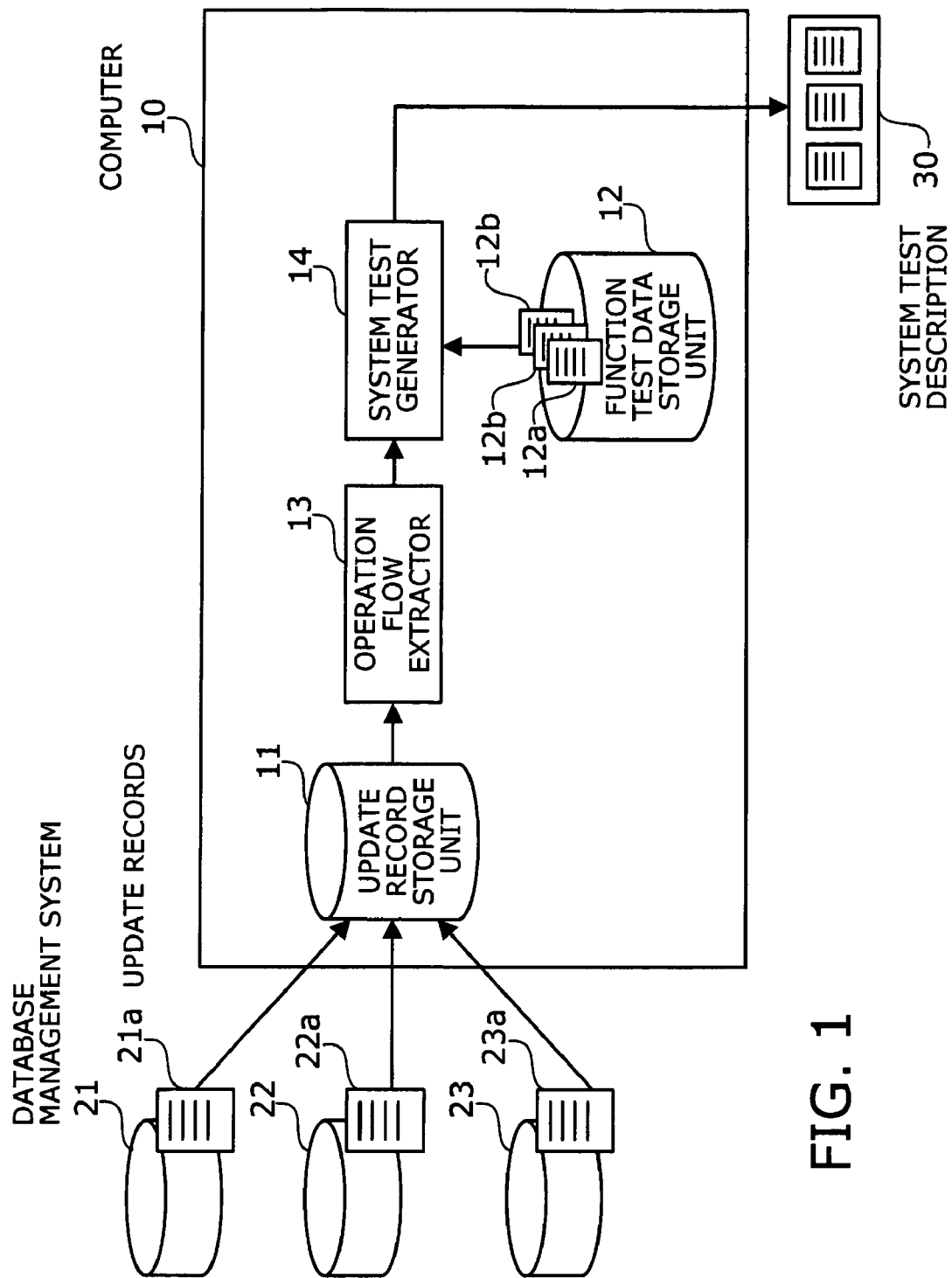
FIG. 1 provides an overview of an embodiment of the present invention.

Preferred embodiments of the present invention will now be described in detail below with reference to the accompanying drawings, wherein like reference numerals refer to like elements throughout. The description begins with an overview of the present invention and then proceeds to more specific embodiments of the invention.

FIG. 1 provides an overview of an embodiment of the present invention. The illustrated computer 10 produces a system test description specifying a sequence of function tests for a specific operation flow that tasks place in actual business situations, based on database update records supplied from database management systems. To this end, the computer 10 includes an update record storage unit 11, a function test data storage unit 12, an operation flow extractor 13, and a system test generator 14.

The update record storage unit 11 stores database update records 21a, 22a, and 23a supplied from database management systems 21, 22, and 23. Each update record 21a, 22a, and 23a includes, among others, the following data items: an identifier that uniquely identifies a data updating process executed in the computer system; a dataset name indicating which dataset was updated by that data updating process; and an update timestamp indicating when the dataset was modified. Note that a single data updating process may update one or more datasets. The term "dataset" refers to, for example, a table in a relational database. The identifier field of an update record may contain, for example, a transaction ID indicating a specific data updating process.

The function test data storage unit 12 stores function test data 12a, 12b, and 12c indicating procedures of function tests. Each function test checks whether each module realizing operation steps constituting an operation flow executed on the computer system satisfies specified requirements. That is, the function test data 12a, 12b, and 12c indicates the way of testing modules that provide each step of an operation flow. Here, the term "module" refers to a program component that offers a specific processing function.

The operation flow extractor 13 analyzes the update records stored in the update record storage unit 11 to extract operation flows. More specifically, the operation flow extractor 13 creates a flow descriptor for each data updating process. The flow descriptor of a data updating process contains the names of all datasets updated by that data updating process, the dataset names being sorted in chronological order of the updating (from earliest to latest).

The system test generator 14 consults the function test data storage unit 12 to retrieve function test data 12a, 12b, and 12c corresponding to each operation step of the operation flow indicated by a flow descriptor that the operation flow extractor 13 has created. With the retrieved function test data, the system test generator 14 creates a system test description 30 describing which function tests should be executed in what order, so as to test the operation flow indicated by the flow descriptor. The order of function tests described in the created system test description matches with the order of operation steps constituting the operation flow.

The above-described computer 10 operates as follows. The operation flow extractor 13 creates a flow descriptor representing in what order the datasets have been updated. For each operation flow, the system test generator 14 creates a system test description 30 specifying a series of function tests arranged in the same order as the operation steps of the flow. That is, the computer 10 uses update records of datasets to identify an actual operation flow taking place on the computer system and produces a system test specification in accordance with that actual operation flow. The resulting system test specification will therefore be very helpful for those who perform a system test in the course of maintenance or modification of the computer system in operation.

First Embodiment

This section will describe in detail a first embodiment of the present invention with reference to the accompanying drawings.

Figure 2:
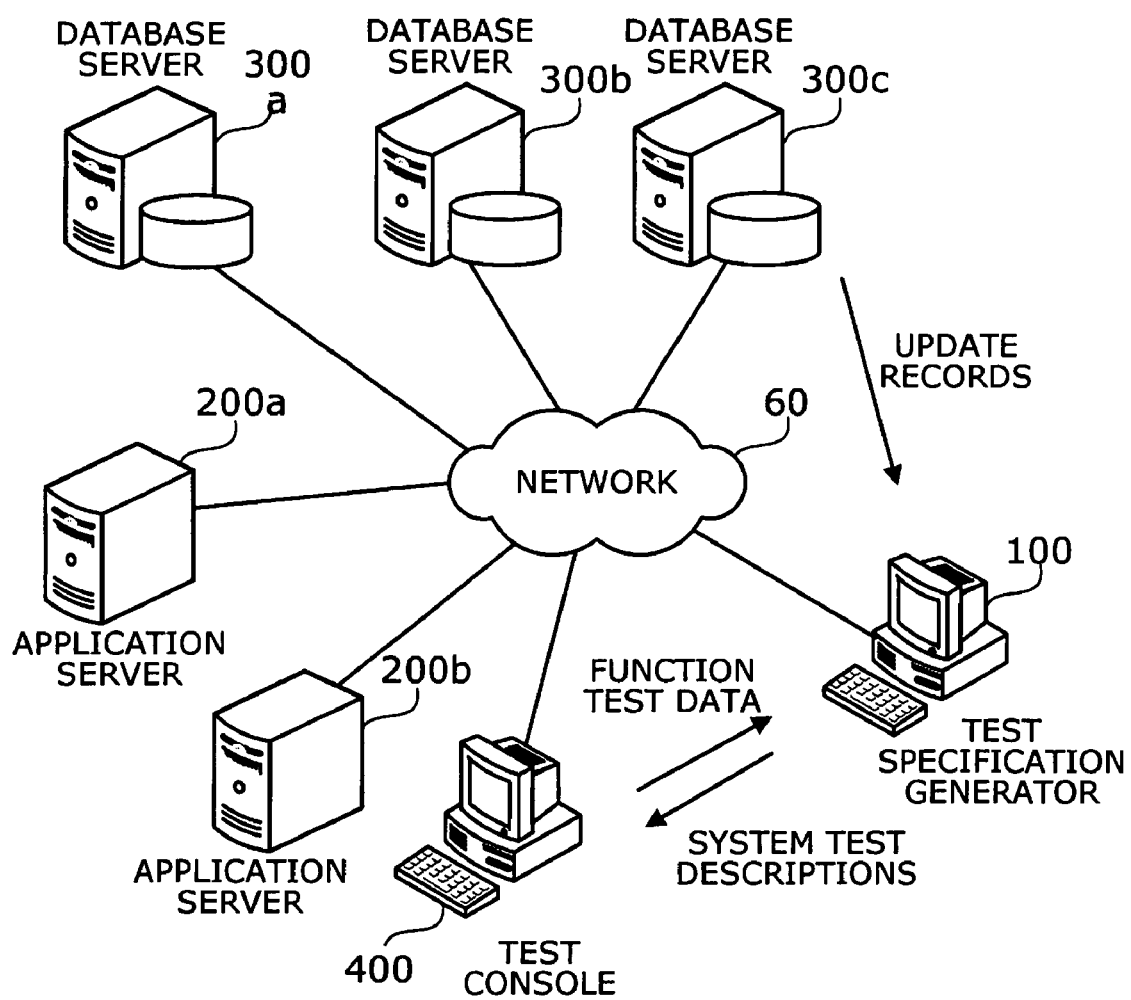
FIG. 2 shows a system configuration of the present embodiment.

FIG. 2 shows a configuration of a system generating a test specification according to the first embodiment of the invention. This system automatically produces a system test specification for an operation flow by analyzing update records of each database which are supplied from a corresponding database management system. Specifically, the system is formed from a test specification generator 100, application servers 200a and 200b, database servers 300a, 300b, and 300c, a test console 400, and a network 60. The test specification generator 100, application servers 200a and 200b, and database servers 300a, 300b, and 300c, and test console 400 are all attached to the network 60 to communicate with each other.

The application servers 200a and 200b execute their respective application programs. For example, one application server 200a executes an inventory management program, while the other application server 200b executes an order management program. Those application programs running on the application servers 200a and 200b make access to the database servers 300a, 300b, and 300c through the network 60, as necessary, to use data records managed on them.

The database servers 300a, 300b, and 300c have their respective database management systems running on them. Each database management system manages data for use by the application programs on the application servers 200a and 200b. The database management systems maintain data records in table form, which can be searched and updated in accordance with a request from application programs. When a certain data record is updated, the corresponding database management system produces a new update record and adds it to a log file. The database servers 300a, 300b, and 300c manage their own log files individually.

The test specification generator 100 collects log files from the database servers 300a, 300b, and 300c through the network 60. The test specification generator 100 then analyzes update records in the collected log files, thereby producing a system test description automatically for an operation flow that actually takes place.

The test console 400 is a terminal device for executing a system test according to the system test description that the test specification generator 100 has produced. The test console 400 stores function test data (described later). The test specification generator 100 can make access to this function test data via the network 60.

While the present embodiment provides a test specification generator 100 to implement the function of generating test specifications, this function of the test specification generator 100 may be embodied in one of the database servers 300*a*, 300*b*, and 300*c*. Or alternatively, the function of the test specification generator 100 may be embodied in one of the application servers 200*a* and 200*b*.

Hardware Platform

This section describes a hardware platform for the test specification generator 100. The same hardware configuration may also be applied to the application servers 200*a* and 200*b*, database servers 300*a*, 300*b*, and 300*c*, and test console 400.

Figure 3:
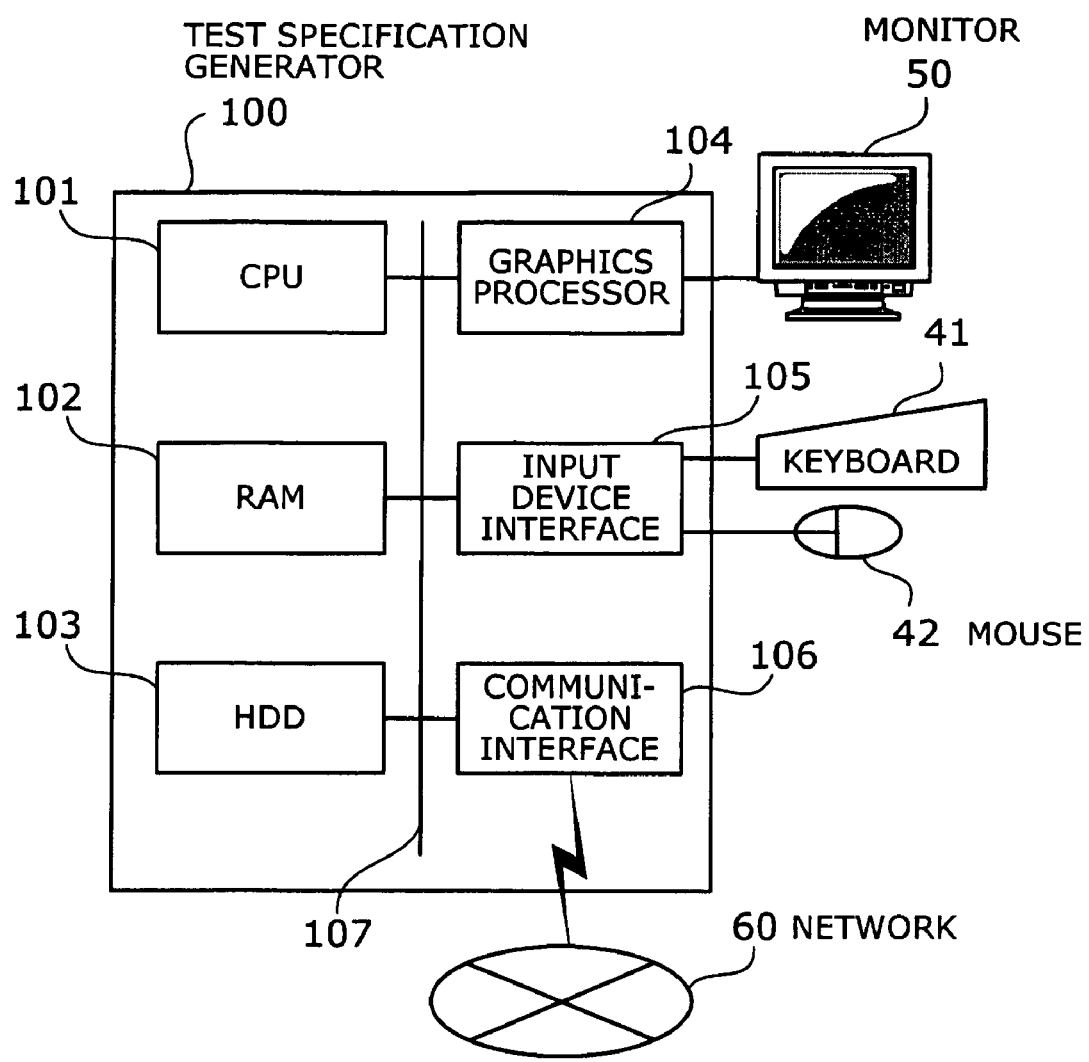
FIG. 3 shows a hardware configuration of a test specification generator.

FIG. 3 shows a hardware configuration of the test specification generator 100. The illustrated test specification generator 100 has the following functional elements: a central processing unit (CPU) 101, a random access memory (RAM) 102, a hard disk drive (HDD) 103, a graphics processor 104, an input device interface 105, and a communication interface 106. The CPU 101 controls the entire device, interacting with other elements via a bus 107.

The RAM 102 serves as temporary storage for the whole or part of operating system (OS) programs and application programs that the CPU 101 executes, in addition to other various data objects manipulated at runtime. The HDD 103 stores program and data files of the operating system and various applications.

The graphics processor 104 produces video images in accordance with drawing commands from the CPU 101 and displays them on a screen of a monitor 50 coupled thereto. The input device interface 105 is used to receive signals from external input devices, such as a keyboard 41 and a mouse 42. Those input signals are supplied to the CPU 101 via the bus 107. The communication interface 106 is connected to the network 60.

The above computer hardware serves as a platform for realizing the processing functions of the present embodiment.

Test Specification Generator

Figure 4:
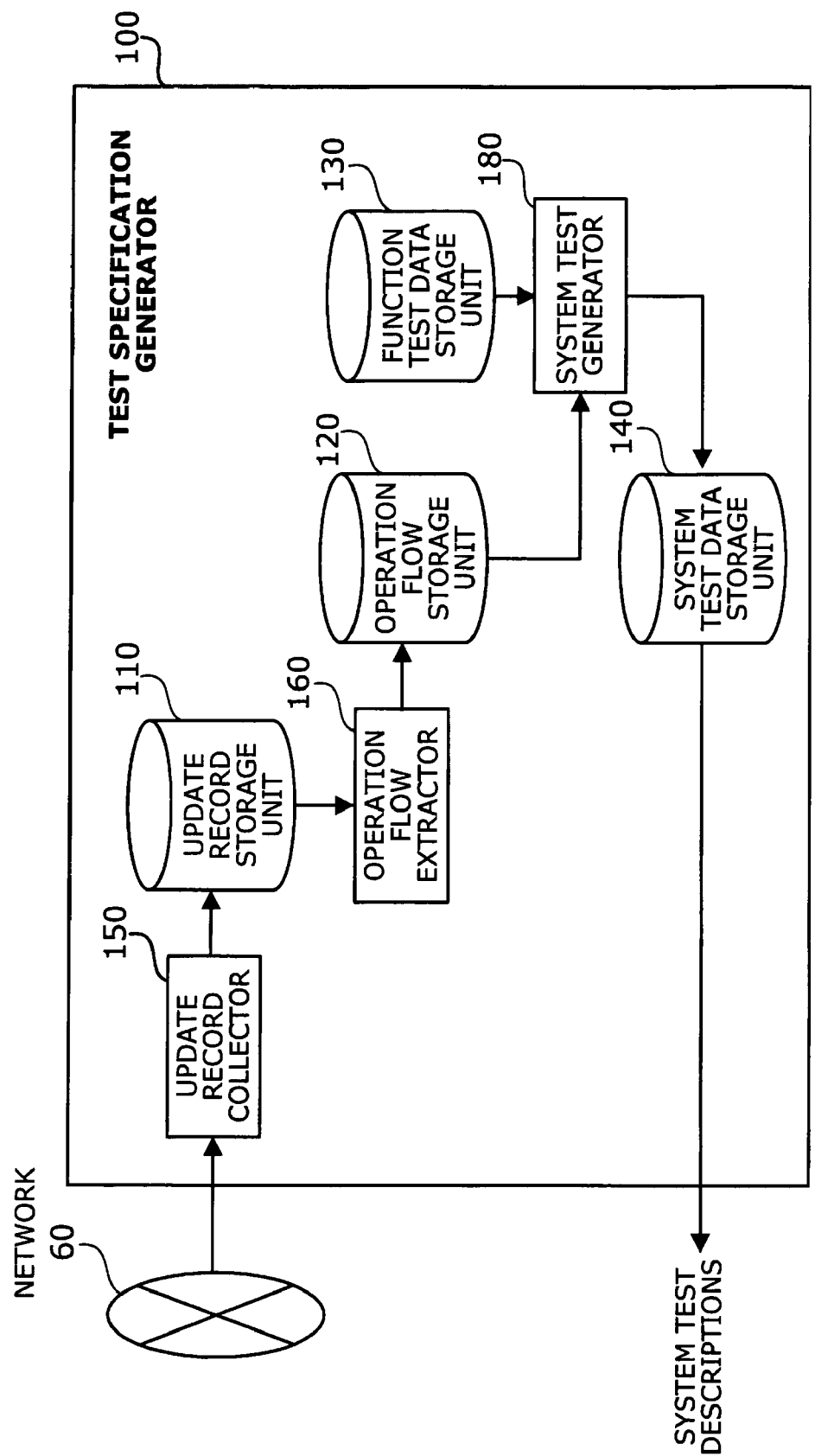
FIG. 4 is a functional block diagram of a test specification generator according to a first embodiment.

Referring now to the block diagram of FIG. 4, this section will describe functional modules constituting the test specification generator 100 according to the first embodiment of the present invention. The test specification generator 100 has an update record storage unit 110, an operation flow storage unit 120, a function test data storage unit 130, a system test data storage unit 140, an update record collector 150, an operation flow extractor 160, and a system test generator 180.

The update record collector 150 can communicate with database servers 300*a*, 300*b*, and 300*c* through the network 60. The update record storage unit 110 stores update records that database management systems produce each time they modify a table. More specifically, an update record is produced each time a new record is added to a table, and each time an existing record of a table is modified or deleted. A single data updating process invoked by an application program may change one or more tables. The produced update records contain a unique identifier indicating what data updating process was done, the name of the table that was updated, and a timestamp indicating when the update was made. The identifier of a data updating process may be, for example, a transaction ID or an identifier specified explicitly by the invoking program.

The operation flow storage unit 120 is where data of operation flows extracted by the operation flow extractor 160 will be stored. An operation flow is represented as a sequence of table names indicating which tables were updated by a data updating process, as well as in what order they were updated. For example, an operation flow may have a value of "Table A, Table B, Table C" to indicate that the data updating process updated three tables A, B, and C in that order. The present invention uses this notation for operation flows because such a sequence of updated datasets most properly represents what tasks were actually done in a computer system.

The function test data storage unit 130 stores function test data, which describes a specific procedure of a function test that determines whether each module realizing operation steps of an operation flow satisfies specified requirements. Such function test data is supplied from the test console 400 via the network 60. During the course of system development, the design engineers test the entire system or its components that they are developing. The procedures of such design-stage testing can also be used as function test data for the purpose of system test generation.

The system test data storage unit 140 is where system test descriptions produced by the system test generator 180 are stored. A system test description gives a sequence of function tests arranged in accordance with the order of operation steps of an operation flow under test. The system test descriptions stored in the system test data storage unit 140 are delivered to the test console 400 and other devices over the network 60, permitting them to execute a system test based on that description.

The update record collector 150 makes access to the database servers 300*a*, 300*b*, and 300*c* at predetermined regular intervals to collect their log files. The update record storage unit 110 searches the collected log files to determine whether there are any new update records in those files, with respect to the previous log files. New update records can be identified by comparing the timestamp of an update record with the time of previous collection of log files. If new update records are found, the update record collector 150 extracts them from the log files and sends them to the update record storage unit 110 as new entries.

When the user gives an instruction for producing system test descriptions, the operation flow extractor 160 analyzes the update records in the update record storage unit 110 to extract operation flows. Specifically, the operation flow extractor 160 first sorts the update records according to which data updating process they belong to. The operation flow extractor 160 then defines, for each data updating process, a table chain giving a series of names of tables in the chronological order of their updates. This table chain serves as a descriptor of an operation flow. The operation flow extractor 160 saves the resulting operation flow descriptors in the operation flow storage unit 120.

When there is a change in the entries of the operation flow storage unit 120, the system test generator 180 retrieves every operation flow descriptor from the operation flow storage unit 120. The system test generator 180 also consults the function test data storage unit 130 to retrieve function test data corresponding to operation steps of each retrieved operation flow. With the retrieved function test data, the system test generator 180 compiles a system test description for each operation flow.

While the update record collector 150 of the present embodiment is configured to make access to the database servers 300a, 300b, and 300c at regular intervals, the invention is not limited to that configuration. Alternatively, the update record collector 150 may be configured to interact with the database servers 300a, 300b, and 300c upon receipt of a user instruction for producing system test descriptions.

The update record storage unit 110 has an update record table 111 enumerating update records. FIG. 5 shows an example data structure of this update record table 111. The illustrated update record table 111 gains a new entry of update record each time a database table is updated. Specifically, the update record table 111 has a "Process ID" field 111a, a "Table Name" field 111b, and an "Update Timestamp" field 111c. A set of associated data fields on each row of the update record table 111 constitutes a single update record.

The Process ID field 111a contains an identification code used to uniquely distinguish each data updating process from others. Transaction IDs, for example, serve this purpose. In the case of using transaction IDs to distinguish data updating processes, the database management systems running on the database servers 300a, 300b, and 300c will assign a unique transaction ID to each single data updating process and include that transaction ID as part of an update record. As an alternative method, the application programs on the application servers 200a and 200b may generate a unique identification code for each data updating process so that the database management systems can include that code in an update record that they produce. The Table Name field 111b holds the name of a table that was updated by the data updating process indicated by the corresponding Process ID field 111a, and the Update Timestamp field 111c indicates when that update happened. The update record collector 150 collects and registers such update records with the update record table 111.

Operation Flow Analysis

Figure 6:
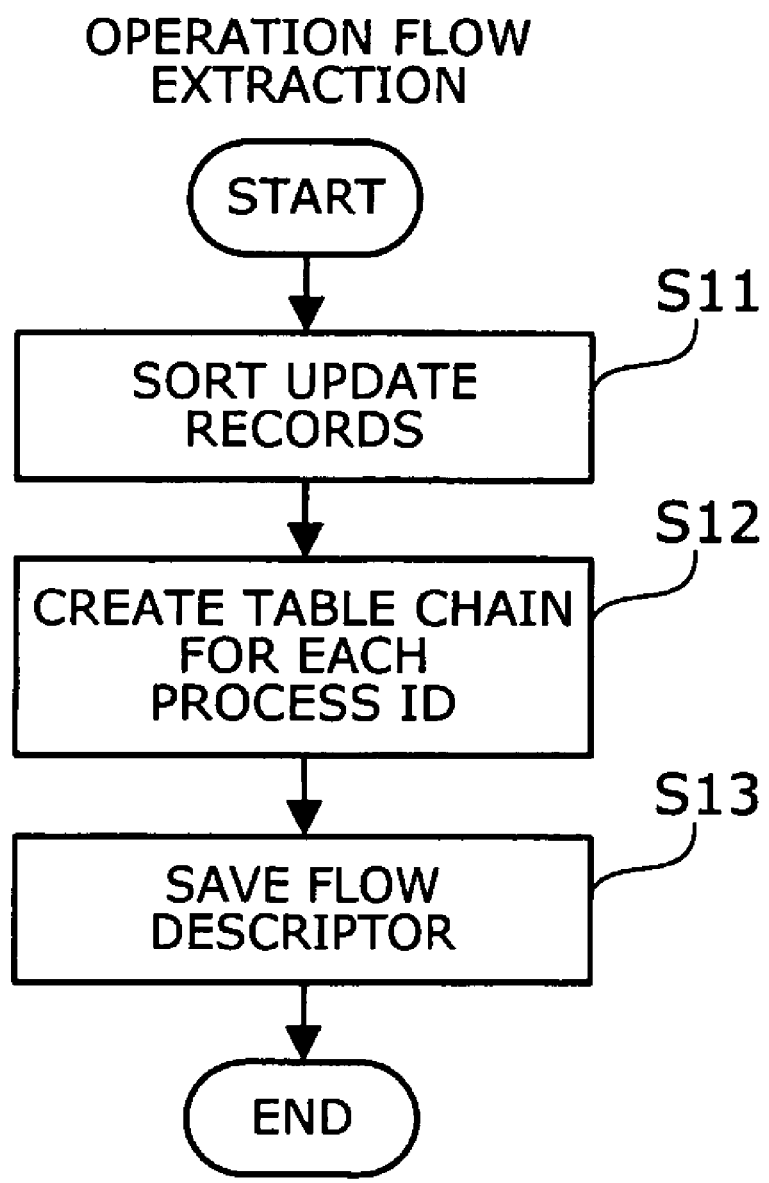
FIG. 6 is a flowchart of a process extracting operation flows.

This section describes a process of extracting operation flows from an update record table having the above-described function and data structure. FIG. 6 is a flowchart of a process extracting operation flows. This process proceeds in accordance with the following steps:

(Step S11) Upon receipt of an instruction for producing a system test description, the operation flow extractor 160 sorts all update records stored in the update record storage unit 110 by using their process ID field as a sort key.

(Step S12) The operation flow extractor 160 may then find two or more update records with the same process ID. If this is the case, the operation flow extractor 160 sorts such update records in the chronological order of their update timestamps. Then the operation flow extractor 160 creates a table chain that gives the names of updated tables in the chronological order of their updates. The operation flow extractor 160 creates such a table chain for each different process ID.

(Step S13) The operation flow extractor 160 saves the extracted operation flows in the operation flow storage unit 120.

The above steps allow the operation flow extractor 160 to create a table chain for each data updating process from update records in the update record storage unit 110.

The operation flow storage unit 120 has an operation flow table 121 enumerating operation flow descriptors. FIG. 7 shows an example data structure of this operation flow table. The illustrated operation flow table 121 contains data of operation flows in table form. Specifically, the operation flow table 121 is formed from an "Occurrence Count" field 121a and a "Table Chain" field 121b. A set of associated data fields on each row of the operation flow table 121 constitutes a single operation flow descriptor.

The Occurrence Count field 121a contains an integer value representing the number of occurrences of each operation flow. That is, this field shows how many times the data updating process of a particular operation flow have been executed. The Table Chain field 121b, on the other hand, shows a series of table names representing an operation flow. The leftmost table name in this field indicates the table that was updated first, while the rightmost table name indicates the last. Table names are delimited by commas, for example. The operation flow extractor 160 extracts and registers such operation flow descriptors with the operation flow table 121.

Figure 8:
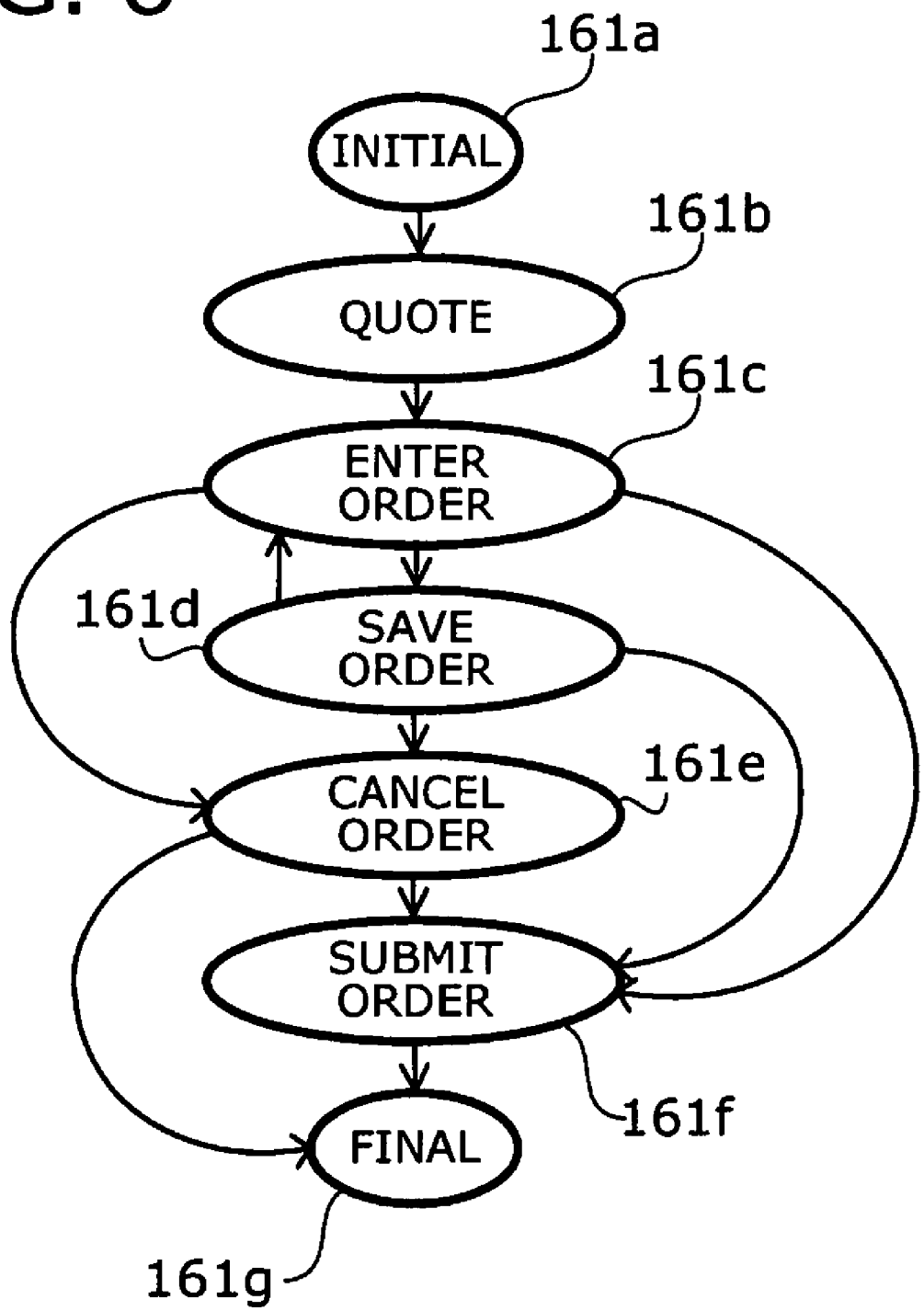
FIG. 8 shows an example of an operation flow.

Referring now to FIG. 8, an example of an operation flow will be described below. FIG. 8 shows all elements of an operation flow in a single chart, where "INITIAL" node 161a indicates the start point of this operation flow and "FINAL" node 161g indicates the end point of the same. Placed between those two nodes 161a and 161g are a plurality of nodes representing operation steps, to each of which a single table name is affixed. The arrows interconnecting those nodes represent in what order the processing operations take place. See the arrow from node 161b to node 161c, for example. This arrow means that a process updating an "ENTER ORDER" table is executed subsequent to a process updating a "QUOTE" table.

Two or more arrows extending from a single node mean that one of the processes at the destination nodes is executed selectively, following the process at the source node. See the arrows from node 161c to node 161d, node 161c to node 161e, and node 161c to node 161f, for example. These three arrows indicate that either "SAVE ORDER" table, "CANCEL ORDER" table, or "SUBMIT ORDER" table is updated, following the process of updating "ENTER ORDER" table.

As can be seen from the above examples, an operation flow can be expressed as a sequence of processes that update tables. In other words, each step of an operation flow (operation step) is a process of updating a certain table.

System Test Generation

Figure 9:
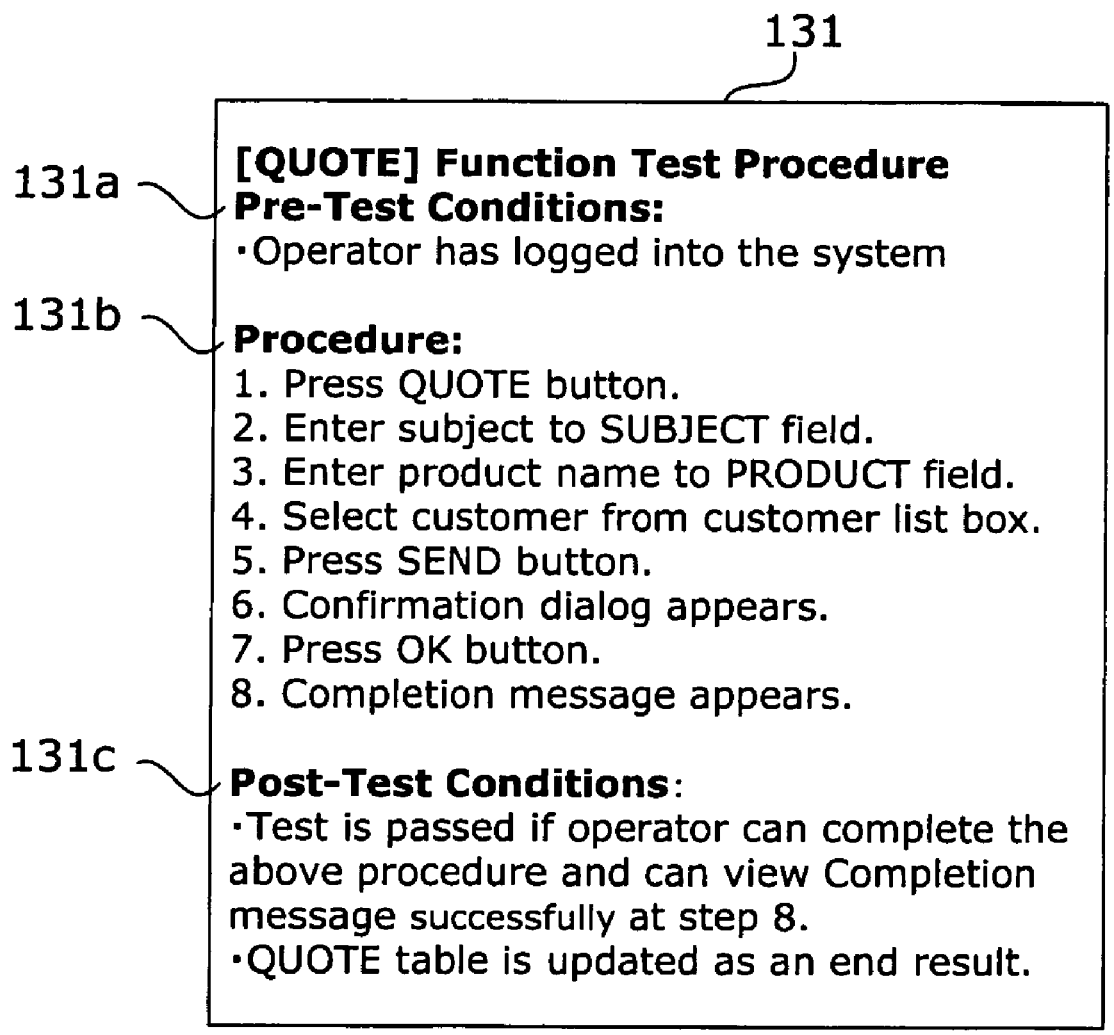
FIG. 9 shows an example of function test data.

Referring now to FIG. 9, a specific example of function test data stored in the function test data storage unit 130 will be described below. Function test data 131 represents a function test procedure that checks whether each module realizing operation steps constituting an operation flow satisfies specified requirements. The function test data 131 is stored in the function test data storage unit 130.

Specifically, the function test data 131 is formed from a "Pre-Test Conditions" section 131a, a "Procedure" section 131b, and a "Post-Test Conditions" section 131c. The "Pre-Test Conditions" section 131a describes what is needed before beginning a function test based on the function test data 131. The "Procedure" section 131b describes detailed steps of the function test. The "Post-Test Conditions" section 131c describes what is expected during or at the end of the function test.

According to the present embodiment, every function test is defined to include some table updates in its "Post-Test Conditions" section 131c. The table names appearing in the "Post-Test Conditions" section 131c are used to associate the function test data 131 with a particular flow descriptor obtained through an operation flow analysis.

Figure 10:
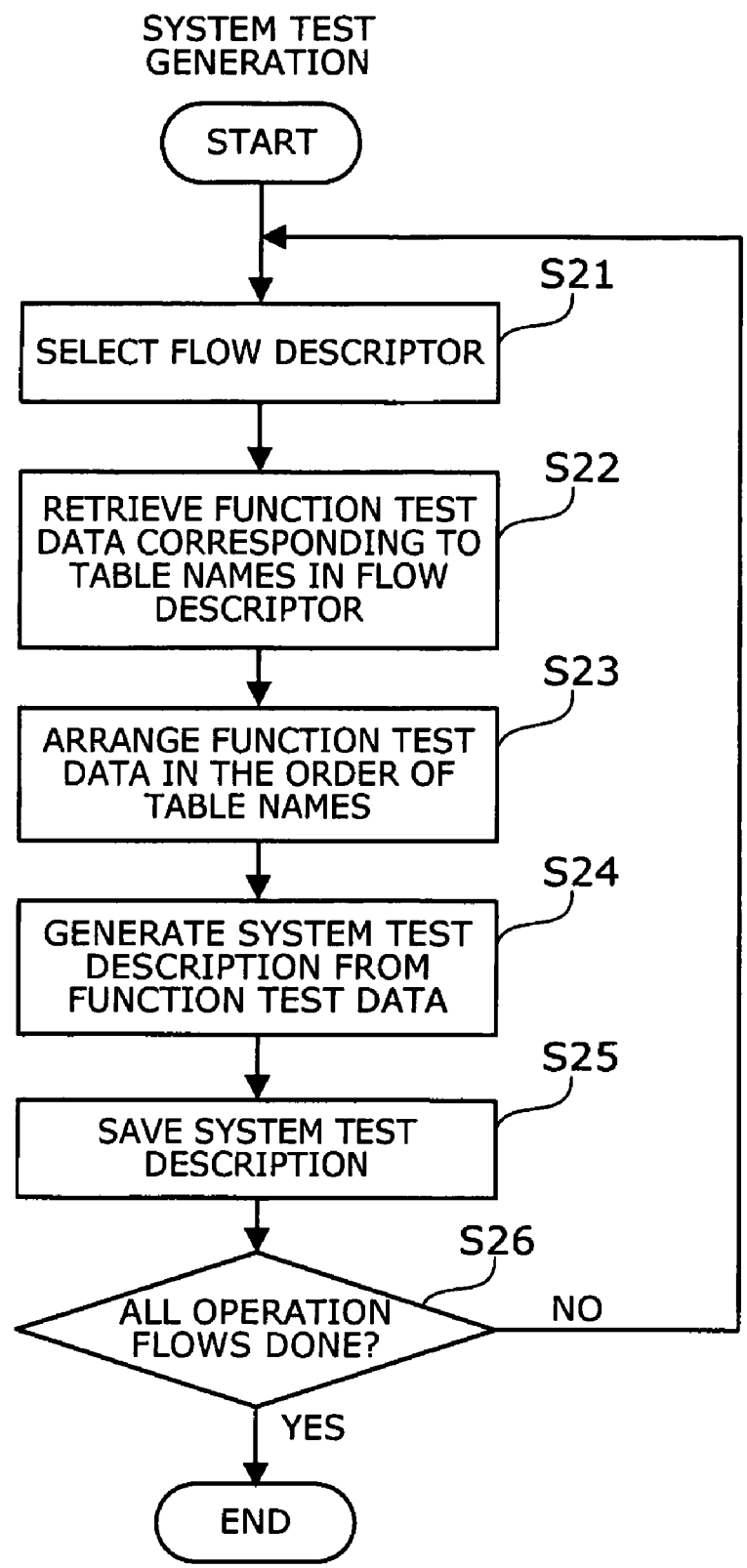
FIG. 10 is a flowchart of a process generating system test descriptions.

Referring now to the flowchart of FIG. 10, a process of generating system test descriptions from flow descriptors and function test data will be described below. This process proceeds in accordance with the following steps:

(Step S21) The system test generator 180 selects a flow descriptor out of those stored in the operation flow storage unit 120.

(Step S22) The system test generator 180 searches the function test data storage unit 130 to retrieve function test data corresponding to the table names enumerated in the flow descriptor selected at step S21.

(Step S23) The system test generator 180 arranges the function test data extracted at step S22 in the order that the table names appear in the flow descriptor.

(Step S24) Based on the function test data arranged at step S23, the system test generator 180 produces a system test description. This system test description includes a piece of information that specifies in what order the function tests should be executed, i.e., the order of function test data arranged at step S23. The system test description also contains a series of test procedures concatenated in accordance with the order of function test data arranged at step S23.

(Step S25) The system test generator 180 saves the generated system test description in the system test data storage unit 140.

(Step S26) If any other flow descriptors remain, the system test generator 180 goes back to step S21 to repeat the above processing with a new flow descriptor. If all flow descriptors are done, the system test generator 180 terminates the process.

As can be seen from the above, when there is a change in the entries of the operation flow storage unit 120, the system test generator 180 retrieves every operation flow descriptor from the operation flow storage unit 120, as well as function test data corresponding to operation steps of each retrieved operation flow from the function test data storage unit 130. For each operation flow, the system test generator 180 compiles the retrieved function test data into a system test description.

System Test Description (1)

This section provides details of a system test description 141 that the system test generator 180 produces. FIG. 11 shows an example of a system test description 141, which serves as a system test specification defining how the system should be tested. More specifically, the system test description 141 is a concatenation of function test data 131 to 133 that should be included in a system test. The system test data storage unit 140 stores this system test description 141.

The illustrated system test description 141 defines what the test operator is expected to do in the system test, the details of which are specified in three instances of function test data 131 to 133 contained therein. In addition to those function test data 131 to 133, the system test description 141 shows a function test sequence 141a and a test number 141b. The function test sequence 141a gives the names of function tests in the order that they are executed. The test number 141b is a serial number assigned to each system test description that is produced from each operation flow.

As can be seen from the above, the system test generator 180 produces a system test description 141 by combining function tests corresponding to operation steps that constitute an operation flow.

Figure 12:
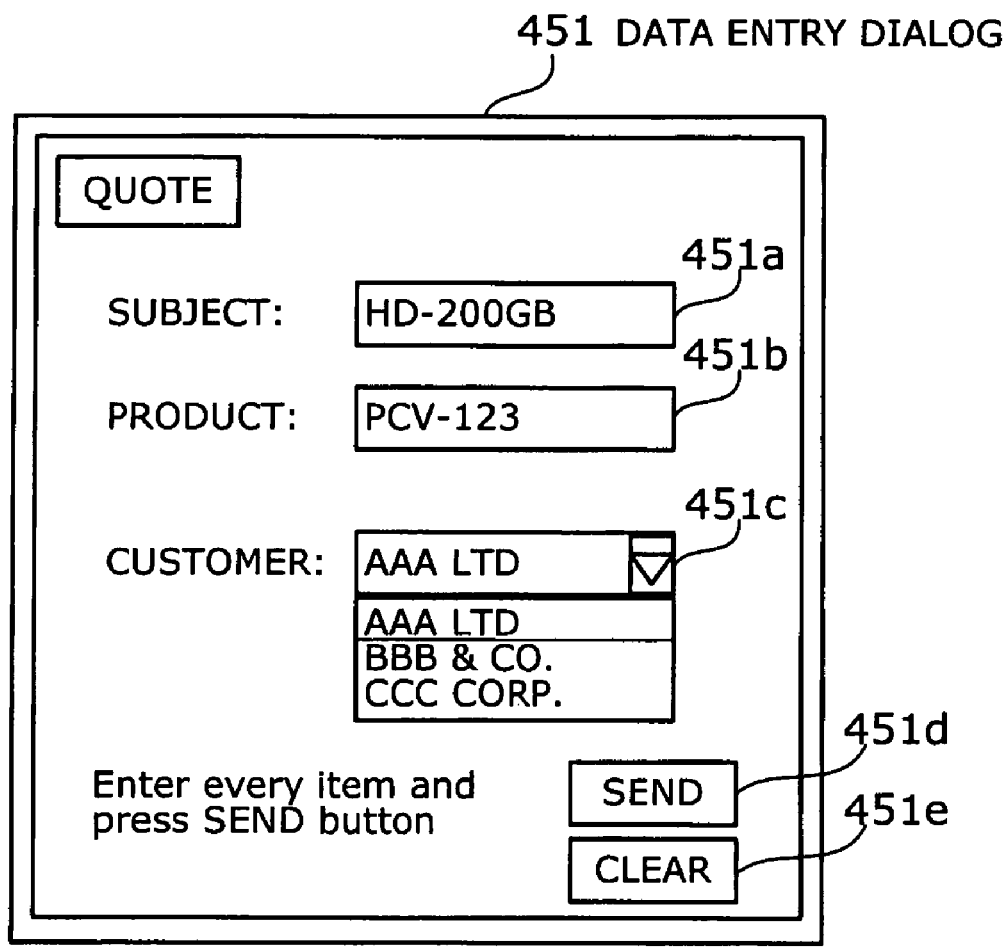
FIG. 12 shows an example of a data entry dialog.

When a system test begins, the system under test will produce various dialogs on a monitor screen. FIG. 12 shows an example of a data entry dialog. This data entry dialog 451 comes up on a monitor (not show) coupled to the test console 400, prompting the operator to enter data during the course of a system test based on the foregoing system test description 141. More specifically, this example data entry dialog 451 appears at step No. 4 in the Procedure section 131b of the first function test data 131 as part of the system test description 141 (FIG. 11).

The data entry dialog 451 provides three input boxes 451a, 451b, and 451c, a SEND button 451d, and a CLEAR button 451e. The input boxes 451a, 451b, and 451c receive input data from the operator when he/she interacts with the system. The operator uses the SEND button 451d to bring his/her quotation to the next step after he/she confirms the entered items. The CLEAR button 451e, on the other hand, allows the operator to cancel all entered items in case he/she may find some mistake in the data entry dialog 451. At this stage of the system test, the operator makes sure that all input boxes 451a, 451b, and 451c are filled in correctly and then presses the SEND button 451d, thus advancing the function test to the next step according to the function test data 131.

Figure 13:
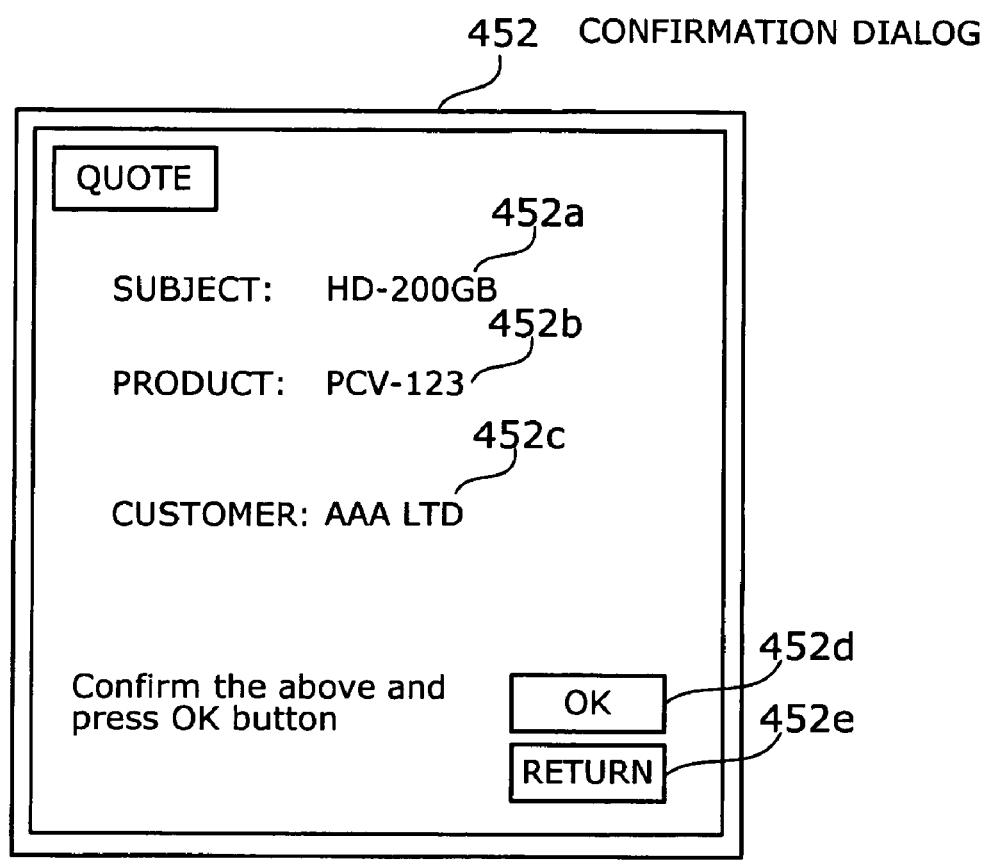
FIG. 13 shows an example of a confirmation dialog in the case where the system test is going on successfully.

FIG. 13 shows an example of a confirmation dialog in the case where the system test is going on successfully. Specifically, this confirmation dialog 452 appears on a screen of the monitor (not shown) coupled to the test console 400 when the system test based on the system test description 141 is proceeding well. The example confirmation dialog 452 is corresponding to step 6 of the procedure 131b, which is described in the function test data 131 as part of the system test description 141 (FIG. 11).

The confirmation dialog 452 is composed of three display fields 452a, 452b, and 452c, an OK button 452d, and a RETURN button 452e. The display fields 452a, 452b, and 452c show what the operator has entered to the system. The OK button 452d is used by the operator to bring his/her quotation to the next step after he/she confirms the items shown on the dialog. The RETURN button 452e, on the other hand, allows him/her to go back to step 2, canceling the current quotation data when he/she has discovered error in the data entry dialog 451.

At this step of the system test, the operator makes sure that all display fields 452a, 452b, and 452c show correct values before pressing the OK button 452d, thus permitting the function test to advance to the next step. If the current function test based on the first function test data 131 is completed with a result satisfying the specified post-test conditions, another function test commences according to the second function test data 132. In this way, the specified function tests are executed successively until the entire system test is finished.

Figure 14:
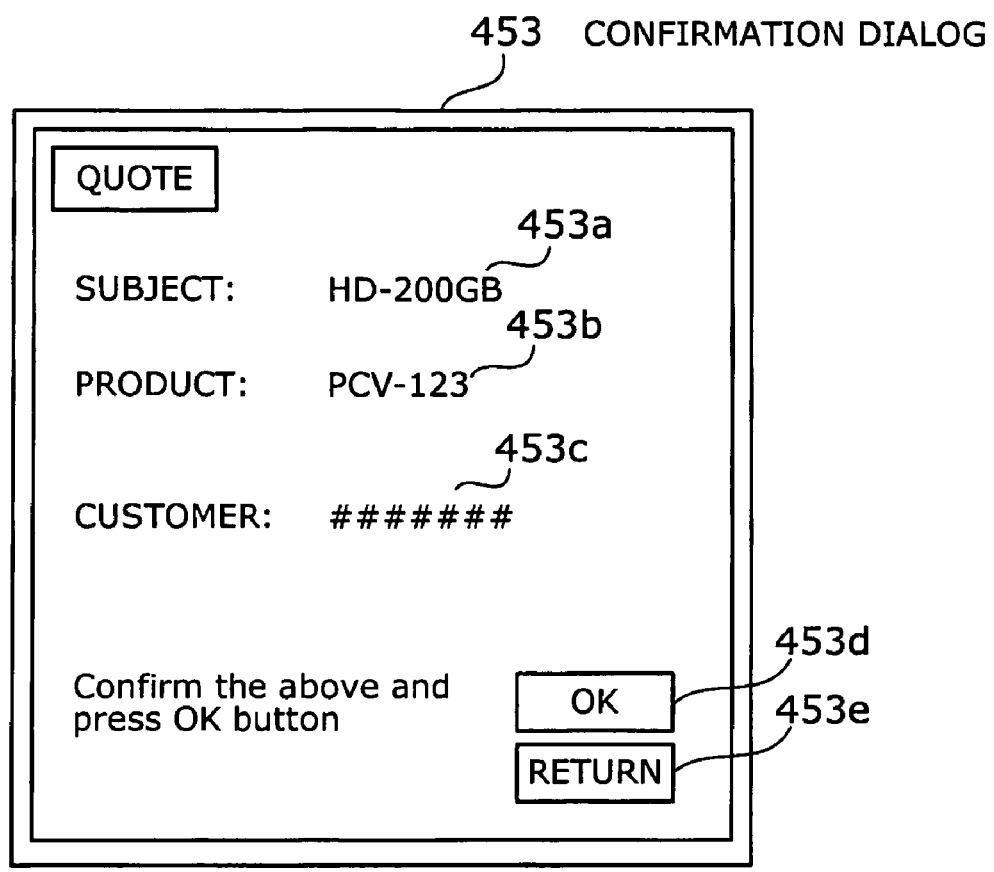
FIG. 14 shows an example of a confirmation dialog in the case where the system test has encountered a problem.

FIG. 14 shows an example of a confirmation dialog in the case where the system test has encountered a problem. Specifically, this confirmation dialog 453 appears on a screen of the monitor (not shown) coupled to the test console 400 when the system test based on the system test description 141 is failed.

Similar to the foregoing confirmation dialog 452 of FIG. 13, the example confirmation dialog 453 of FIG. 14 appears at step 6 of the procedure 131b described in the first function test data 131, as part of the system test description (see FIG. 11). The confirmation dialog 453 has three display fields 453a, 453b, and 453c, an OK button 453d, and a RETURN button 452e. The operator now sees garbled characters "#######" in the display field 453c, instead of a correct value. The operator thus finds that the system test has failed.

The above-described test specification generator 100 of the first embodiment identifies operation flows from a collection of update records and creates a system test description 30 enumerating function tests in the same order as corresponding operation steps of each identified operation flow. The resulting system test specification thus reflects real-world operation flows and will be very helpful for those who perform a system test in the course of maintenance or modification of a computer system in operation.

Second Embodiment

This section describes a second embodiment of the present invention with reference to FIGS. 15 to 20. The second embodiment is similar to the first embodiment to some extent; the following description will focus on their differences, not repeating the explanation for their common part.

As in the first embodiment, the system generating test specifications according to the second embodiment also analyzes update records of databases under the control of database management systems so as to automatically produce a system test specification for each operation flow that is found. In addition, the second embodiment sorts the operation flows in the order of their occurrence counts and produces system test descriptions only for a selected set of operation flows whose occurrence counts exceed a predetermined threshold. The second embodiment also enables the produced system test descriptions to be output in descending order of occurrence counts of their corresponding operation flows, i.e., from the most frequent operation flow to the least frequent operation flow. This feature of the second embodiment makes the resulting test specification focus on important operation flows.

The second embodiment operates in the same system environment discussed earlier in the first embodiment with reference to FIG. 2. According to the second embodiment, however, a test specification generator 500 is connected to the network 60 in place of the test specification generator 100 of the first embodiment.

Figure 15:
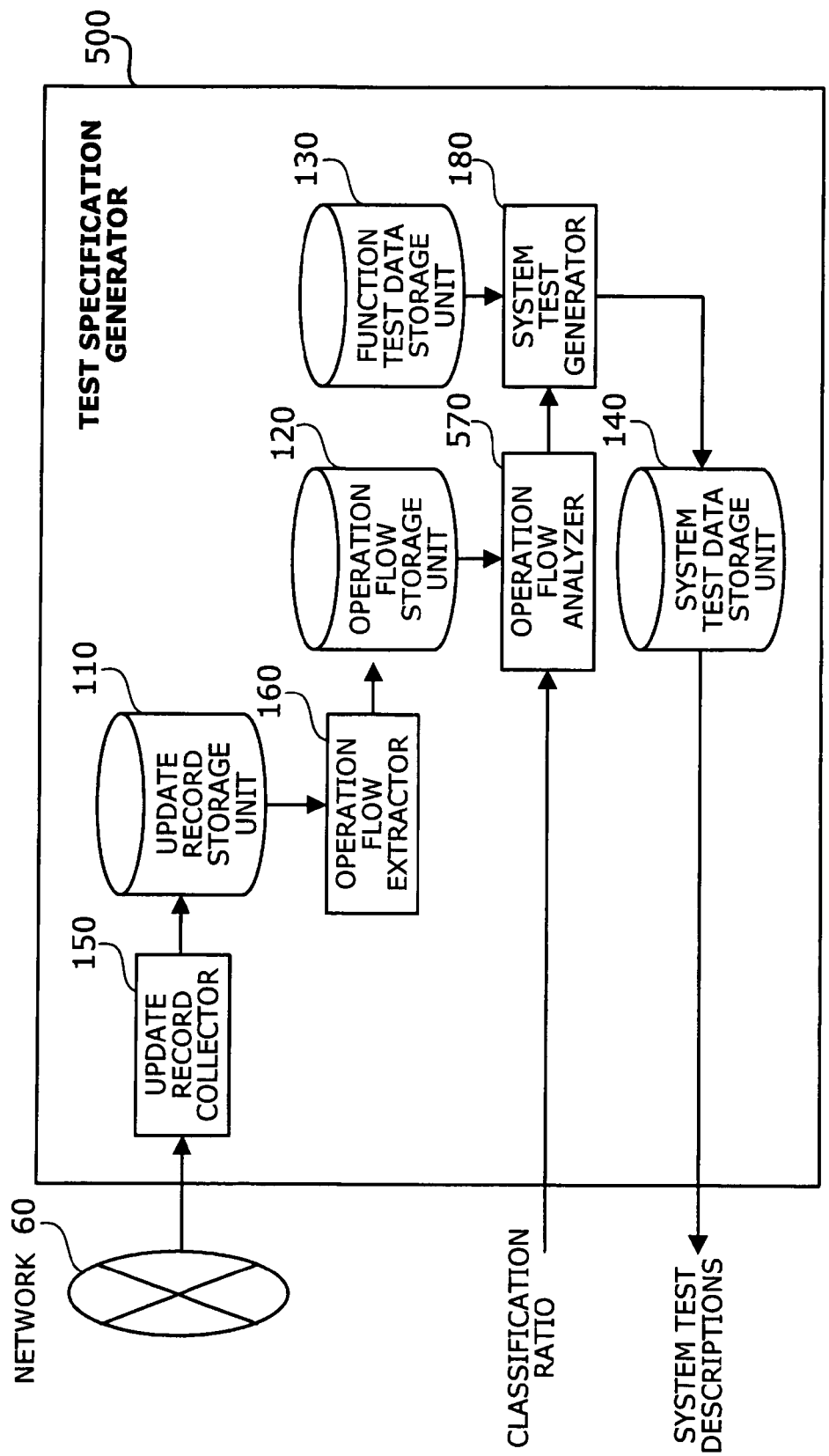
FIG. 15 is a functional block diagram of a test specification generator according to a second embodiment of the present invention.

FIG. 15 is a functional block diagram of a test specification generator according to the second embodiment. This test specification generator 500 includes the following elements: an update record storage unit 110, an operation flow storage unit 120, a function test data storage unit 130, a system test data storage unit 140, an update record collector 150, an operation flow extractor 160, an operation flow analyzer 570, and a system test generator 180.

All the above elements of the test specification generator 500, except for the operation flow analyzer 570, operate in the same way as in the first embodiment described earlier. That is, the update record collector 150 communicates with database servers 300a, 300b, and 300c via the network 60. The update record storage unit 110 stores update records supplied from database management systems. The operation flow storage unit 120 is where operation flow descriptors produced by the operation flow extractor 160 will be stored. The function test data storage unit 130 stores function test data. The system test data storage unit 140 stores system test descriptions produced by the system test generator 180. The update record collector 150 makes access to the database servers 300a, 300b, and 300c at predetermined intervals to collect their log files. The update record storage unit 110 searches the collected log files to determine whether there are any new update records in those files, with respect to the previous version of log files. If new update records are found, the update record collector 150 extracts them from the log files and adds them to the update record storage unit 110. The operation flow extractor 160 analyzes those update records in the update record storage unit 110 to extract operation flows when the user gives an instruction for producing system test description. The operation flow extractor 160 then saves the resulting operation flow descriptors in the operation flow storage unit 120.

According to the second embodiment, the user's instruction for producing system test descriptions may include a classification ratio specified by the user. The term "classification ratio" refers to the ratio of what is to be identified as "routine operation flow" of all instances of operation flow. The classification ratio may take a value of, for example, 0.6 (60 percent).

The operation flow analyzer 570 counts the number of identical flow descriptors among those produced by the operation flow extractor 160 and stored in the operation flow storage unit 120. The operation flow analyzer 570 then identifies a set of operation flows whose occurrence counts are equal to or greater than a predetermined threshold. The identified operation flows are referred to as "routine operation flows" whereas the rest of the operation flows are referred to as "exceptional operation flows." Stated simply, routine operation flows happen frequently, whereas exceptional operation flows occur infrequently.

The operation flow analyzer 570 sorts operation flows in descending order of occurrence count and outputs their flow descriptors in that order. The operation flow analyzer 570 further identifies exceptional operation flows that involve redoing and outputs their flow descriptors. The operation flow analyzer 570 can receive user inputs through a keyboard 41 and/or mouse 42 (FIG. 3).

According to the second embodiment, the system test generator 180 receives all the information on operation flows from the operation flow analyzer 570. The system test generator 180 then retrieves function test data corresponding to operation steps of each operation flow and produces system test descriptions from the retrieved function test data in the same way as in the first embodiment.

Figure 16:
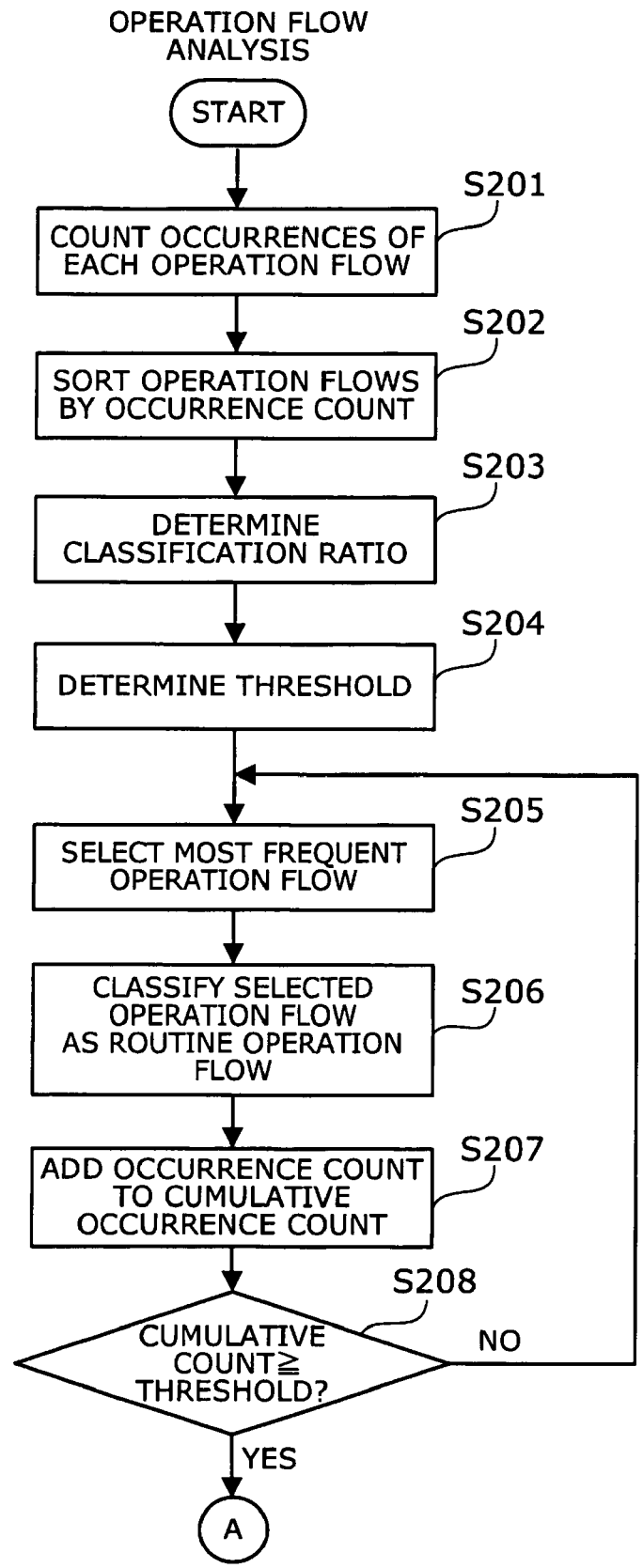
FIGS. 16 and 17 show a flowchart of an operation flow analysis according to the second embodiment.
Figure 17:
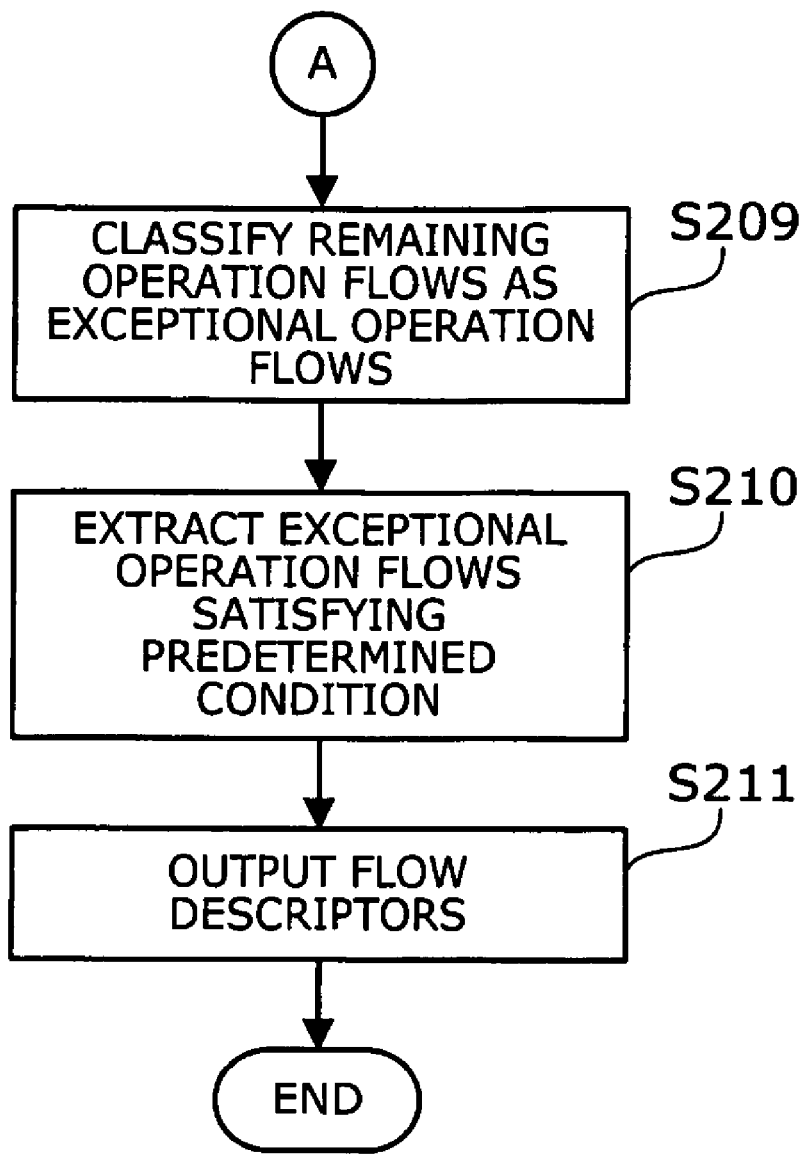

According to the second embodiment, the significance of each operation flow is determined. FIGS. 16 and 17 show a flowchart of an operation flow analysis according to the second embodiment, which proceeds in accordance with the following steps:

(Step S201) The operation flow analyzer 570 summarizes all table chains that have been produced at step S12 of the operation flow extraction process (FIG. 6) and stored in the operation flow storage unit 120. If there are groups of identical table chains, the operation flow analyzer 570 counts the number of such table chains constituting each group. The resulting numbers represent the occurrence count of each operation flow. The operation flow analyzer 570 also sends a user-specified classification ratio in the case where the user's instruction for producing a system test description includes it.

(Step S202) The operation flow analyzer 570 sorts the operation flow descriptors provided by the operation flow extractor 160 in descending order of occurrence counts obtained at step S201.

(Step S203) In the case where a user-specified classification ratio is given, the operation flow analyzer 570 accepts it as a specific value of classification ratio for subsequent use. If no particular values are specified, the operation flow analyzer 570 uses a predetermined default classification ratio.

(Step S204) The operation flow analyzer 570 calculates the total number of occurrences of operation flows sorted at step S202. The operation flow analyzer 570 then multiplies this total occurrence count by the classification ratio determined at step S203, thereby obtaining a threshold for classification of operation flows.

(Step S205) The operation flow analyzer 570 selects a most frequent operation flow from among those that were sorted at step S202 but have not been subjected to a classification process of steps S205-S208.

(Step S206) The operation flow analyzer 570 classifies the operation flow selected at step S205 as a routine operation flow.

(Step S207) The operation flow analyzer 570 calculates a cumulative occurrence count of operation flows classified as routine operation flows. That is, the operation flow analyzer 570 adds the occurrence count of the selected operation flow to the cumulative occurrence count.

(Step S208) The operation flow analyzer 570 determines whether the cumulative occurrence count has reached the threshold determined at step S204. If the cumulative occurrence count is equals to or greater than the threshold, the process advances to step S209 (FIG. 17). If the cumulative occurrence count is smaller than the threshold, the process returns to step S205.

(Step S209) Some of the sorted operation flows remain unclassified because of their relatively small occurrence counts. The operation flow analyzer 570 classifies those operation flows as exceptional operation flows.

(Step S210) Out of the above exceptional operation flows, the operation flow analyzer 570 extracts such instances that satisfy a predetermined condition.

Then the operation flow analyzer 570 produces a piece of information indicating those extracted exceptional operation flows.

(Step S211) The operation flow analyzer 570 outputs routine operation flow descriptors each containing a table chain and its occurrence count. These descriptors describe each operation flow classified as a routine operation flow at step S206. The operation flow analyzer 570 also outputs exceptional operation flow descriptors each containing a table chain and its occurrence count, which describe each operation flow classified as an exceptional operation flow at step S209. The exceptional operation flow descriptors further contain the information produced at step S210.

There are several ways to narrow down the exceptional operation flows at step S210. For example, the operation flow analyzer 570 may extract exceptional operation flows having the following properties: those bearing close similarity to routine operation flows, those including a specified table chain, those involving redoing of steps, or those including repetitive operations. The following paragraphs will give more details of such operation flows.

Similarity between two operation flows can be evaluated by, for example, calculating the distance between their table chains. The distance between table chains is represented by a positive integer indicating how much the two table chains are separate from each other. The Levenshtein distance may be used as the measure of this metric. In this case, the exact match has a distance of zero; the more different the two table chains are, the greater their distance value becomes. The test specification generator 500 expands its test coverage by adding operation flows similar to the frequently occurring routine operation flows.

The operation flow analyzer 570 may also extract operation flows including a specific table chain designated by the user. With this feature, the system test can focus on particular functional components of the system which have been modified or newly introduced.

The operation flow analyzer 570 can extract operation flows that involve redoing. This is achieved by, for example, examining each exceptional operation flow to find such flows that include two or more tables with the same name. Users actually go back and forth in an attempt to complete their tasks. Such behavior of users may not always be foreseen at the design stage of system development. The operation flow analyzer 570 of the second embodiment makes it possible to find such unexpected operation flows, thus expanding the test coverage.

The operation flow analyzer 570 can further extract such operation flows that include repetitive operations. This is achieved by, for example, determining whether the same table name appears in a table chain twice in succession. The second embodiment makes it possible to test whether the system operates correctly when the same operation step has to be repeated in a practical situation.

At step S210, the operation flow analyzer 570 extracts such a particular kind of operation flows in the way described above. The operation flow analyzer 570 then produces a piece of information indicating those extracted exceptional operation flows.

To summarize this section, the operation flow analyzer 570 rounds up all table chains produced by the operation flow extractor 160 and determines the occurrence count of each operation flow. The operation flow analyzer 570 then determines a threshold of cumulative occurrence counts from a given classification ratio, so as to classify operation flows into routine operation flows with higher frequencies of occurrence and exceptional operation flows with lower frequencies of occurrence. The classification ratio may be specified explicitly by the user or defined previously as a default ratio.

The operation flow analyzer 570 produces flow descriptors for exceptional operation flows satisfying a predetermined condition, in addition to those for routine operation flows. With those flow descriptors, the system test generator 180 produces system test descriptions. The resulting system test description is thus directed only to the routine operation flows and a subset of the exceptional operation flows which satisfies a predetermined condition.

Routine/Exceptional Operation Flow Descriptors

This section will describes routine operation flow descriptors 571 and exceptional operation flow descriptors 572 that the operation flow analyzer 570 produces.

FIG. 18 shows an example data structure of routine operation flow descriptors. The illustrated routine operation flow descriptors 571 describe operation flows classified as routine operation flows. Each routine operation flow descriptor 571 is formed from two parts. One is "Occurrence Count" field 571*a* indicating the occurrence count of an operation flow, and the other is "Table Chain" field 571*b* showing the table chain of the same. These two associated data fields (located side by side in FIG. 18) constitutes a single routine operation flow descriptor.

The Occurrence Count field 571*a* of a routine operation flow contains an integer value representing occurrence count, i.e., how many times the data updating process of that routine operation flow has occurred. The Table Chain field 571*b* contains a series of table names, enumerating all tables updated in the routine operation flow in chronological order. In the example shown in FIG. 18, the leftmost table name in this Table Chain field indicates the table that was updated first, while the rightmost table name indicates the last. The operation flow analyzer 570 produces such routine operation flow descriptors 571 and passes them to the system test generator 180.

FIG. 19 shows an example data structure of exceptional operation flow descriptors. The illustrated exceptional operation flow descriptors 572 describe operation flows classified as exceptional operation flows. Each exceptional operation flow descriptor 572 is formed from the following three data fields: "Occurrence Count" field 572*a* indicating the occurrence count of an operation flow, "Table Chain" field 572*b* showing the table chain of that flow, and "Redo Indicator" field 572*c* indicating whether the operation flow involves redoing of steps. These three associated data fields (located side by side in FIG. 19) constitutes a single exceptional operation flow descriptor.

The Occurrence Count field 572a of an exceptional operation flow contains an integer value of occurrence count, i.e., how many times the data updating process of that exceptional operation flow has occurred. The Table Chain field 572b contains a series of table names, enumerating all tables involved in the exceptional operation flow in the order that they are updated. In the example shown in FIG. 19, the leftmost table name in this Table Chain field indicates the table that was updated first, while the rightmost table name indicates the last. The Redo Indicator field 572c indicates whether the operation flow involves redoing if steps. The operation flow analyzer 570 produces such exceptional operation flow descriptors 572 and passes them to the system test generator 180.

System Test Description (2)

Figure 20:
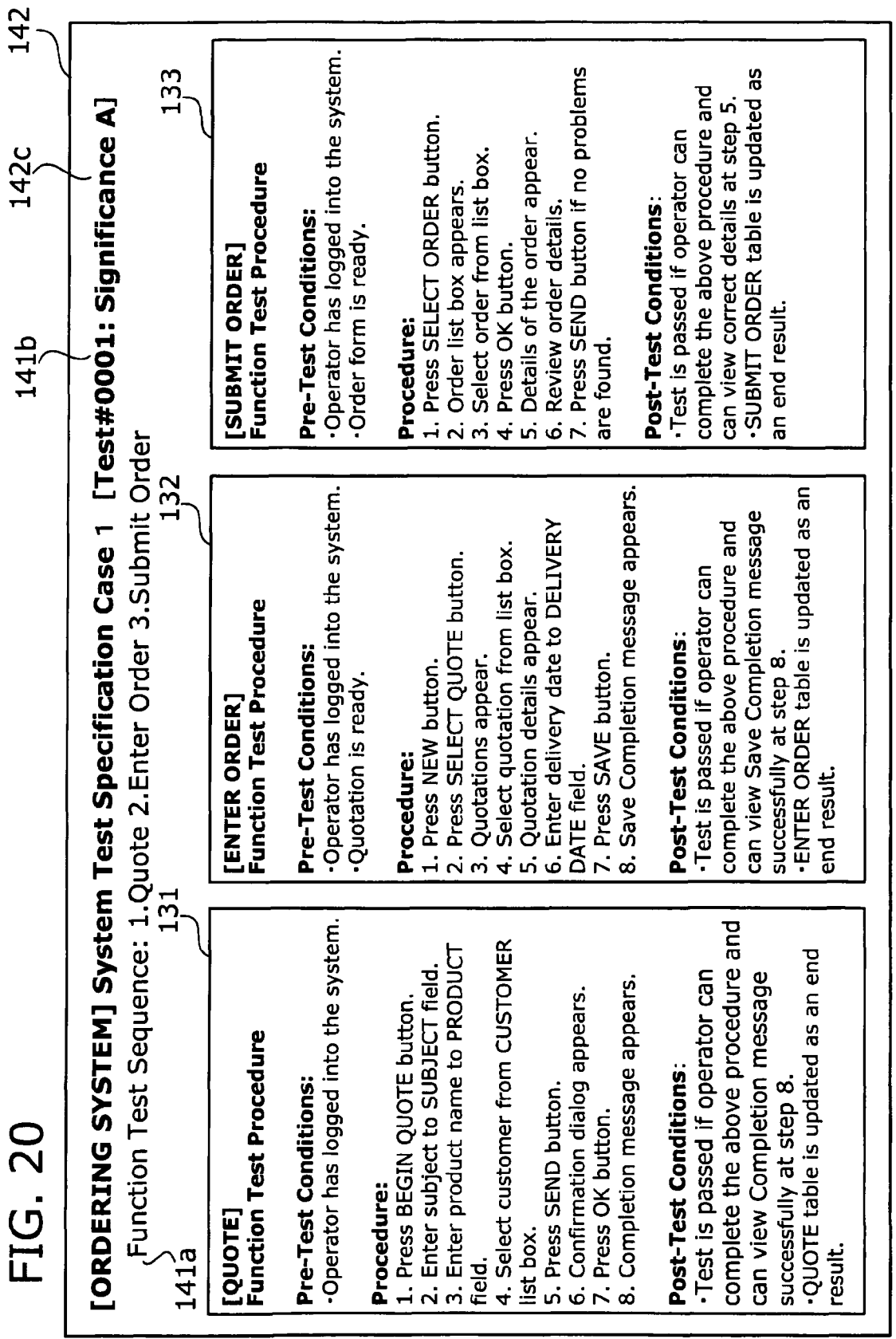
FIG. 20 shows an example of a system test description according to the second embodiment.

Referring to FIG. 20, the system test description 142 according to the second embodiment will be described in detail below. The system test description 142 gives a test specification describing which part of the system should be tested and how, just as the system test description 141 does in the first embodiment. Specifically, the system test description 142 is formed as a collection of function test data 131 to 133. The system test data storage unit 140 stores this system test description 142.

The system test description 142 of the second embodiment includes a significance indicator 142c, in addition to what the system test description 141 of the first embodiment provides. The significance indicator 142c indicates the significance of the system test description 142. Specifically, the significance of a system test description increases as its corresponding operation flow has a greater occurrence count.

The system test description 142 has a test number "0001" as shown in FIG. 20. This test number 141b is a serial number assigned to each system test description produced for each operation flow. According to the second embodiment, system test descriptions are produced in descending order of occurrence counts of operation flows since the operation flow analysis sorts the operation flows by their occurrence counts. This means that, in the second embodiment, the test number 141b can also serve as a significance indicator.

With the above-described feature of the second embodiment, the test specification generator 500 outputs system test descriptions 142 including a piece of information permitting the user to see the significance of each system test.

Besides providing the same advantages as the test specification generator 100 according to the first embodiment, the test specification generator 500 further makes it possible to produce test specifications automatically prioritizing operation flows that frequently occur. The test specification generator 500 also permits a system administrator and other users to identify which of the produced test specifications is most important. The resulting system test specifications will be very helpful for those who perform a system test in the course of maintenance or modification of a computer system in operation.

Third Embodiment

Figure 21:
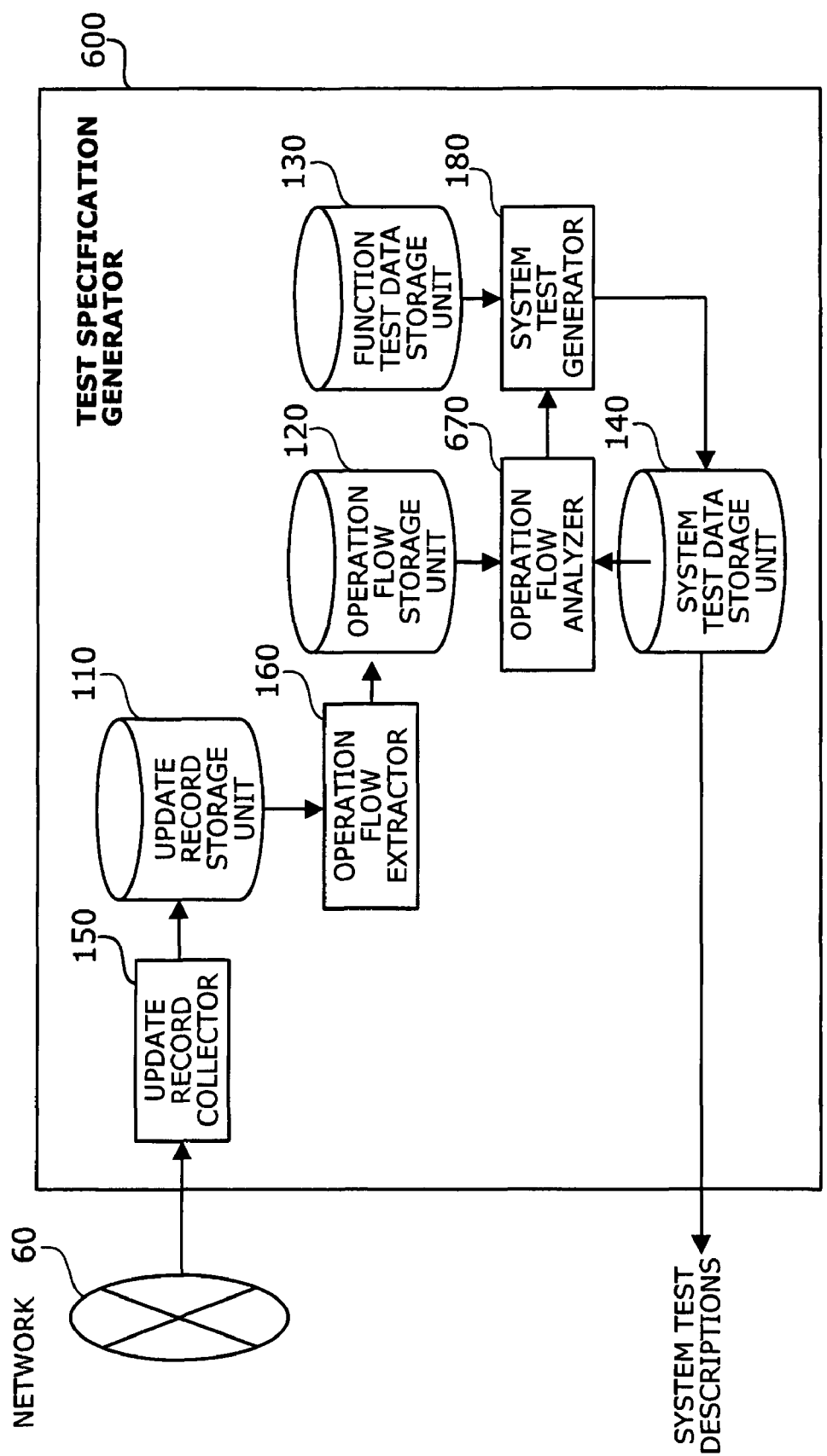
FIG. 21 is a functional block diagram of a test specification generator according to a third embodiment of the present invention.
Figure 22:
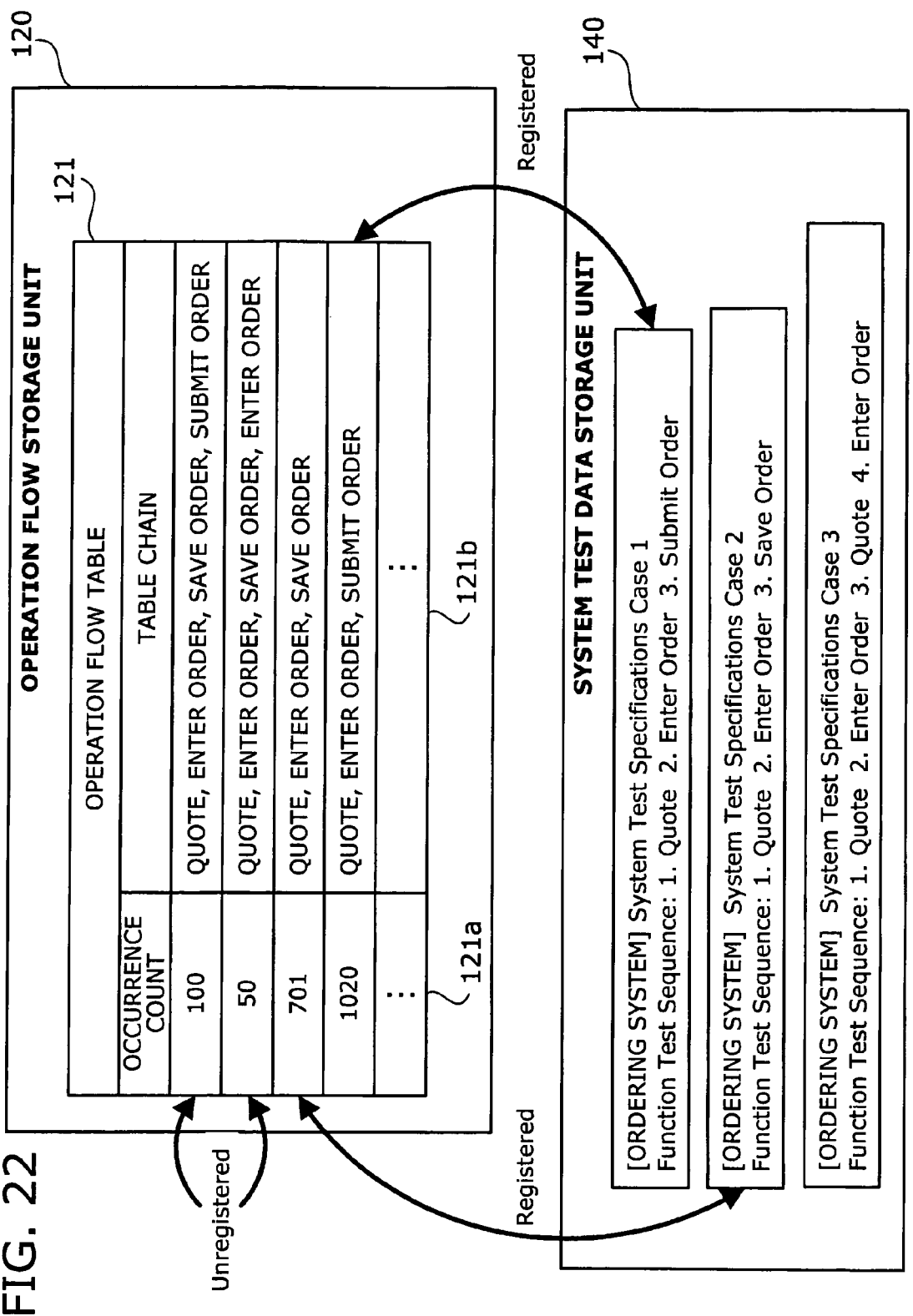
FIG. 22 shows the third embodiment analyzes operation flows.
Figure 23:
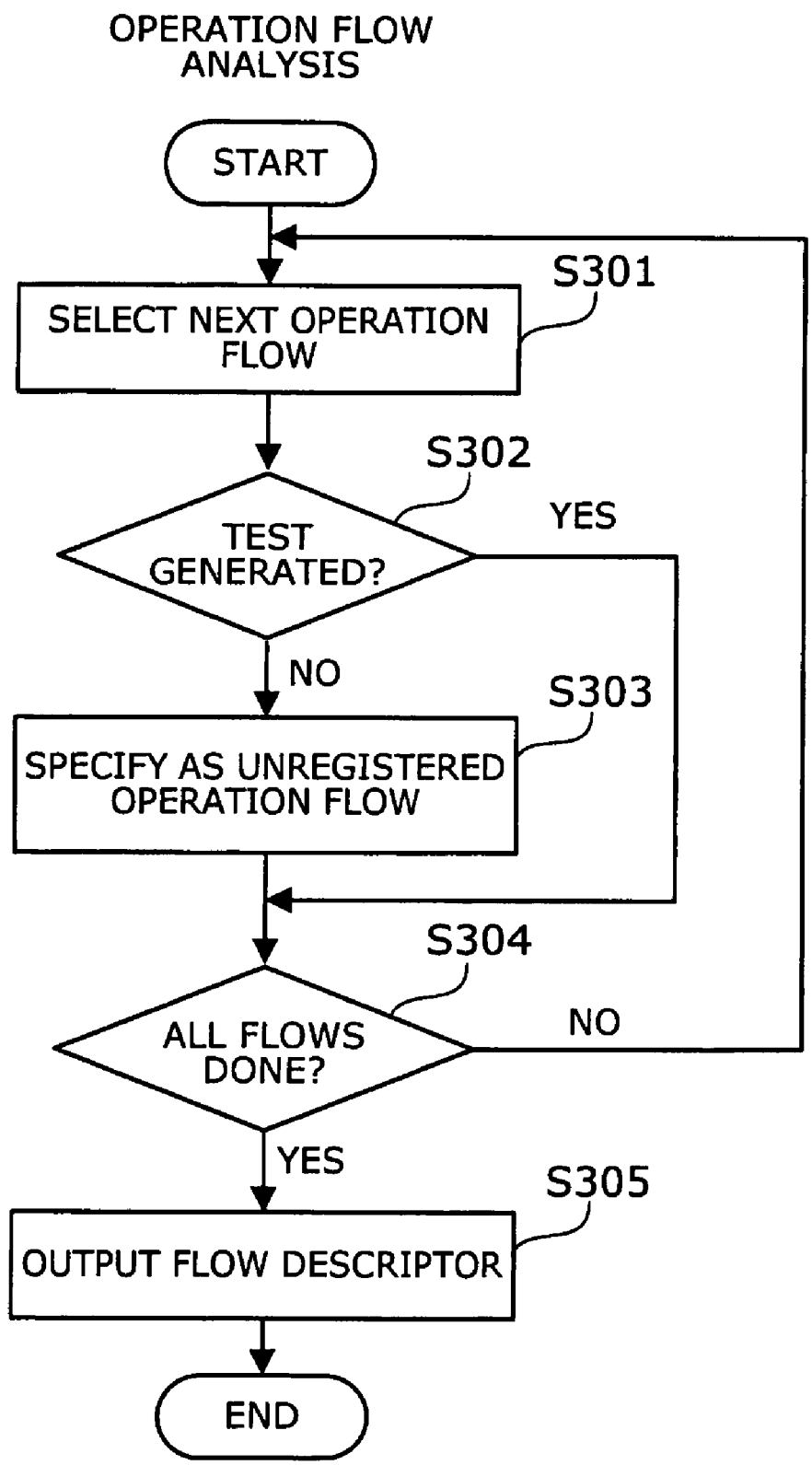
FIG. 23 is a flowchart of an operation flow analysis according to the third embodiment.

This section describes a third embodiment of the present invention with reference to FIGS. 21 to 23. Since the third embodiment is similar to the first embodiment to some extent, the following description will focus on their differences, not repeating the explanation for their common part.

As in the first embodiment, the system generating test specifications according to the third embodiment analyzes update records of databases under the control of database management systems to automatically produce a system test specification for each operation flow. In addition to that, the proposed system of the third embodiment determines whether there is an existing system test description corresponding to a newly produced flow descriptor. If no corresponding system test description is found, the test specification generation system identifies that operation flow as an unregistered operation flow and then outputs a system test description dedicated for that unregistered operation flow. This feature of the third embodiment improves the efficiency of testing since it is possible to narrow down the scope of automatic test generation by excluding existing test specifications.

The test specification generation system of the third embodiment serves in a system environment discussed earlier in the first embodiment with reference to FIG. 2. According to the third embodiment, however, a test specification generator 600 is connected to the network 60 in place of the test specification generator 100 of the first embodiment.

FIG. 21 is a functional block diagram of the test specification generator 600 according to the third embodiment. The test specification generator 600 includes the following elements: an update record storage unit 110, an operation flow storage unit 120, a function test data storage unit 130, a system test data storage unit 140, an update record collector 150, an operation flow extractor 160, an operation flow analyzer 670, and a system test generator 180.

All the above elements of the test specification generator 600, except for the operation flow analyzer 670, operate in the same way as in the first embodiment described earlier. That is, the update record collector 150 communicates with database servers 300a, 300b, and 300c via the network 60. The update record storage unit 110 stores update records supplied from database management systems. The operation flow storage unit 120 is where operation flow descriptors produced by the operation flow extractor 160 will be stored. The function test data storage unit 130 stores function test data. The system test data storage unit 140 stores system test descriptions produced by the system test generator 180. The update record collector 150 makes access to the database servers 300a, 300b, and 300c at predetermined intervals to collect their log files. The update record storage unit 110 searches the collected log files to determine whether there are any new update records in those files, with respect to the previous log files. If new update records are found, the update record collector 150 extracts them from the log files and adds them to the update record storage unit 110. The operation flow extractor 160 analyzes the update records in the update record storage unit 110 to extract an operation flow when the user gives an instruction for producing a system test description. The operation flow extractor 160 then saves the resulting operation flow descriptors in the operation flow storage unit 120.

The operation flow analyzer 670 examines operation flow descriptors that have been produced by the operation flow extractor 160 and stored in the operation flow storage unit 120, so as to identify such operation flows that have no corresponding system test descriptions in the system test data storage unit 140. The operation flow analyzer 670 then classifies those operation flows as unregistered operation flows. The operation flow analyzer 670 outputs flow descriptors only for those unregistered operation flows. Accordingly, the system test generator 180 produces system test descriptions only for the unregistered operation flows.

The system test generator 180 receives all operation flow descriptors produced by the operation flow analyzer 670. The system test generator 180 also consults the function test data storage unit 130 to retrieve function test data corresponding to operation steps in each operation flow. The system test generator 180 then produces system test descriptions from the retrieved function test data.

Referring to FIG. 22, the third embodiment analyzes operation flows as follows. The operation flow analyzer 670 examines operation flow descriptors stored in the operation flow storage unit 120 to identify such operation flows that have no corresponding system test descriptions in the system test data storage unit 140. The operation flow analyzer 670 classifies those operation flows as unregistered operation flows. More specifically, the operation flow analyzer 670 looks into an operation flow descriptor in the operation flow table 121, which is stored in the operation flow storage unit 120. The operation flow analyzer 670 then compares the table chain field 121*b* of that operation flow descriptor with the function test sequence of every registered system test description in the system test data storage unit 140. If a match is found, the operation flow analyzer 670 identifies the operation flow as a registered operation flow. If no matches are found, the operation flow analyzer 670 identifies the operation flow as an unregistered operation flow.

The third embodiment examines each extracted operation flow as to whether it is an unregistered operation flow. FIG. 23 is a flowchart of the operation flow analysis according to the third embodiment. This analysis proceeds in accordance with the following steps:

(Step S301) The operation flow analyzer 670 selects a flow descriptor out of those stored in the operation flow storage unit 120.

(Step S302) The operation flow analyzer 670 searches the system test data storage unit 140 to determine whether there is an existing system test description derived from the same operation flow as the selected operation flow. If no such entries are found in the system test data storage unit 140, the process advances to step S303. If there is an existing system test description derived from the same operation flow as the selected operation flow, the process skips to step S304.

(Step S303) The operation flow analyzer 670 specifies the selected operation flow as an unregistered operation flow.

(Step S304) The operation flow analyzer 670 goes back to step S301 if there are flow descriptors that have not been selected. If all flow descriptors have been selected, then the operation flow analyzer 670 proceeds to step S305.

(Step S305) The operation flow analyzer 670 creates unregistered operation flow descriptors from the table chain and occurrence count of each operation flow specified as an unregistered operation flow at step S303.

Through the above steps, the operation flow analyzer 670 examines each operation flow descriptor stored in the operation flow storage unit 120 to identify unregistered operation flows having no corresponding system test descriptions in the system test data storage unit 140. The operation flow analyzer 670 then supplies the system test generator 180 with flow descriptors only for those unregistered operation flows. The system test generator 180 thus produces system test descriptions only for the unregistered operation flows.

Besides providing the same advantages as the test specification generator 100 of the first embodiment, the above-described test specification generator 600 further makes it possible to automatically produce test specifications only for such operation flows that have not yet been tested in the system. The resulting system test specifications will contribute to improved efficiency of system testing in the course of maintenance or modification of a computer system in operation.

This section and preceding sections have described the proposed programs and device for generating test specifications, based on the specific embodiments illustrated in the accompanying drawings. The present invention, however, should not be limited to the above-described programs or devices. Each element of those programs and devices may be replaced with an equivalent element that performs essentially the same function. The present invention also allows any other structural elements or processing steps to be added to the above-described devices or programs. Lastly, any combinations of elements or features of the foregoing embodiments will also fall within the scope of the present invention.

Computer-readable Medium

The above-described processing mechanisms of the present invention are actually implemented on a computer system. The functions of test specification generators 100, 500, and 600 are described and made available in the form of computer programs. A computer system executes such programs to provide the intended functions of the present invention. The programs are stored in a computer-readable medium for the purpose of storage and distribution. Suitable computer-readable storage media include magnetic storage devices, optical discs, magneto-optical storage media, and semiconductor memory devices, for example. Magnetic storage devices include hard disk drives (HDD), flexible disks (FD), and magnetic tapes (MT), for example. Optical discs include digital versatile discs (DVD), DVD-RAM, compact disc read-only memory (CD-ROM), CD-Recordable (CD-R), and CD-Rewritable (CD-RW), for example. Magneto-optical storage media include magneto-optical discs (MO), for example.

Portable storage media, such as DVD and CD-ROM, are suitable for distribution of program products. Network-based distribution of software programs may also be possible, in which case several master program files are made available on a server computer for downloading to other computers via a network.

A computer stores test specification generating programs in its local storage unit, which have previously been installed from a portable storage media or downloaded from a server computer. The computer executes the programs read out of the local storage unit, thereby performing the programmed functions. As an alternative way of program execution, the computer may execute programs, reading out program codes directly from a portable storage medium. Another alternative method is that the user computer dynamically downloads programs from a server computer when they are demanded and executes them upon delivery.

CONCLUSION

To summarize the above sections, the present invention identifies operation flows from a collection of update records and creates a system test description enumerating function tests in the same order as corresponding operation steps of each identified operation flow. The resulting system test specification thus reflects the real-world operation flows and will be a great help for those who perform a system test in the course of maintenance or modification of a computer system in operation.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program for automatically generating a system test description for a computer system, the program, when executed by a computer, causing the computer system to perform a procedure comprising:

analyzing stored update records each including a process identifier that uniquely identifies a data updating process executed on a dataset, a dataset name indicating which dataset was updated by the data updating process, and an update timestamp indicating when the dataset was updated, to create a flow descriptor for each data updating process identified by the process identifier, the flow descriptor containing the dataset names of all datasets updated by the data updating process, the dataset names being sorted in chronological order of the update timestamps;

retrieving function test data corresponding to each operation step of an operation flow indicated by the created flow descriptor, by consulting stored function test data which indicates procedures of function tests for checking whether each module realizing operation steps of operation flows executed on the computer system satisfies specified requirements; and producing, from the retrieved function test data, a system test description describing the order of the function tests for each operation flow indicated by the created flow descriptor, wherein the order of the function tests described in the created system test description matches with that of operation steps constituting the operation flow.

2. The computer-readable medium according to claim 1, wherein the procedure further comprises:

calculating an occurrence count of each operation flow by counting the number of identical flow descriptors among those produced by the analyzing, and identifying such operation flows whose occurrence counts are equal to or greater than a predetermined threshold, and classifying the identified operation flows as routine operation flows, wherein the producing produces the system test descriptions only for the routine operation flows.

3. The computer-readable medium according to claim 1, wherein the procedure further comprises:

calculating an occurrence count of each operation flow by counting the number of identical flow descriptors among those produced by the analyzing, and identifying such operation flows whose occurrence counts are smaller than a predetermined threshold, and classifying the identified operation flows as exceptional operation flows, wherein the producing produces the system test descriptions for a subset of the exceptional operation flows, the subset consisting of the exceptional operation flows whose flow descriptors contain at least two consecutive identical dataset names.

4. The computer-readable medium according to claim 1, wherein the procedure further comprises:

storing the system test descriptions in a memory; and examining the created operation flow descriptors to identify such operation flows that have no corresponding system test descriptions in the memory, and classifying the identified operation flows as unregistered operation flows;

wherein the producing produces the system test descriptions only for the unregistered operation flows and saves the produced system test descriptions in the memory.

5. An apparatus for automatically generating a system test description for a computer system, the apparatus comprising:

an update record storage unit configured to store update records each including: a process identifier that uniquely identifies a data updating process executed on a dataset, a dataset name indicating which dataset was updated by the data updating process, and an update timestamp indicating when the dataset was updated;

a function test data storage unit configured to store function test data indicating procedures of function tests, wherein each function test checks whether each module realizing operation steps constituting an operation flow executed on the computer system satisfies specified requirements;

an operation flow extractor that analyzes the update records stored in the update record storage unit to create a flow descriptor for each data updating process identified by the process identifier, the flow descriptor containing the dataset names of all datasets updated by the data updating process, the dataset names being sorted in chronological order of the update timestamps; and a system test generator that consults the function test data storage unit to retrieve the function test data corresponding to each operation step of an operation flow indicated by the flow descriptor that the operation flow extractor has created, and produces a system test description describing the order of function tests, for each operation flow indicated by the flow descriptor, wherein the order of the function tests described in the created system test description matches with that of operation steps constituting the operation flow.

* * * * *